United States Patent
Grubish et al.

(10) Patent No.: US 11,960,136 B2
(45) Date of Patent: Apr. 16, 2024

(54) CABLE RESTRAINTS FOR SPLICE ENCLOSURES AND SPLICE ENCLOSURES INCLUDING CABLE RESTRAINTS

(71) Applicant: PREFORMED LINE PRODUCTS CO., Mayfield Village, OH (US)

(72) Inventors: Christopher Grubish, Solon, OH (US); Cameron Joseph Clines, Chagrin Falls, OH (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 30 days.

(21) Appl. No.: 17/748,799

(22) Filed: May 19, 2022

(65) Prior Publication Data

US 2022/0373756 A1 Nov. 24, 2022

Related U.S. Application Data

(60) Provisional application No. 63/190,778, filed on May 19, 2021.

(51) Int. Cl.
*G02B 6/44* (2006.01)

(52) U.S. Cl.
CPC ......... *G02B 6/4454* (2013.01); *G02B 6/4447* (2013.01); *G02B 6/445* (2013.01); *G02B 6/4471* (2013.01)

(58) Field of Classification Search
CPC .... G02B 6/4447; G02B 6/445; G02B 6/4454; G02B 6/4471
See application file for complete search history.

(56) References Cited

U.S. PATENT DOCUMENTS

| | | | |
|---|---|---|---|
| 8,903,216 B2* | 12/2014 | Thompson | G02B 6/3888 385/139 |
| 9,541,726 B2* | 1/2017 | Geens | G02B 6/4457 |

(Continued)

FOREIGN PATENT DOCUMENTS

| | | |
|---|---|---|
| WO | 2019209643 A1 | 10/2019 |
| WO | 2020154408 A1 | 7/2020 |

(Continued)

OTHER PUBLICATIONS

Corresponding International Patent Application No. PCT/US2022/030088, International Search Report and Written Opinion, dated Aug. 19, 2022.

*Primary Examiner* — Ryan A Lepisto
(74) *Attorney, Agent, or Firm* — Cooper Legal Group, LLC

(57) ABSTRACT

A cable restraint located in a splice enclosure to restrain a cable includes a tray having a bottom side with an upward facing surface. The cable restraint also includes a restraint bridge removably attached to the tray. The restraint bridge includes a central portion having a surface configured to cooperate with the tab feature to inhibit relative motion between the restraint bridge and the tray in a direction non-perpendicular to an axis of the cable. A restraint clip is removably attached to the restraint bridge and includes a restraint post attached to the body portion configured to secure a strength member of the cable to the restraint clip. The restraint clip further includes a column attached to the body portion configured to inhibit relative motion between the restraint clip and the restraint bridge in the direction non-perpendicular to the axis of the cable.

20 Claims, 27 Drawing Sheets

(56) References Cited

U.S. PATENT DOCUMENTS

| | | | |
|---|---|---|---|
| 9,753,239 B2* | 9/2017 | Allen | G02B 6/4471 |
| 10,379,310 B2* | 8/2019 | Aznag | G02B 6/46 |
| 10,707,663 B2* | 7/2020 | Kempeneers | H02G 15/013 |
| 10,935,748 B2* | 3/2021 | Cams | G02B 6/4471 |
| 2009/0136185 A1 | 5/2009 | Bayazit et al. | |
| 2016/0161695 A1 | 6/2016 | Chen et al. | |
| 2022/0120987 A1* | 4/2022 | Geens | G02B 6/4452 |

FOREIGN PATENT DOCUMENTS

| | | |
|---|---|---|
| WO | 2021026879 A1 | 2/2021 |
| WO | 2021055356 A1 | 3/2021 |

\* cited by examiner

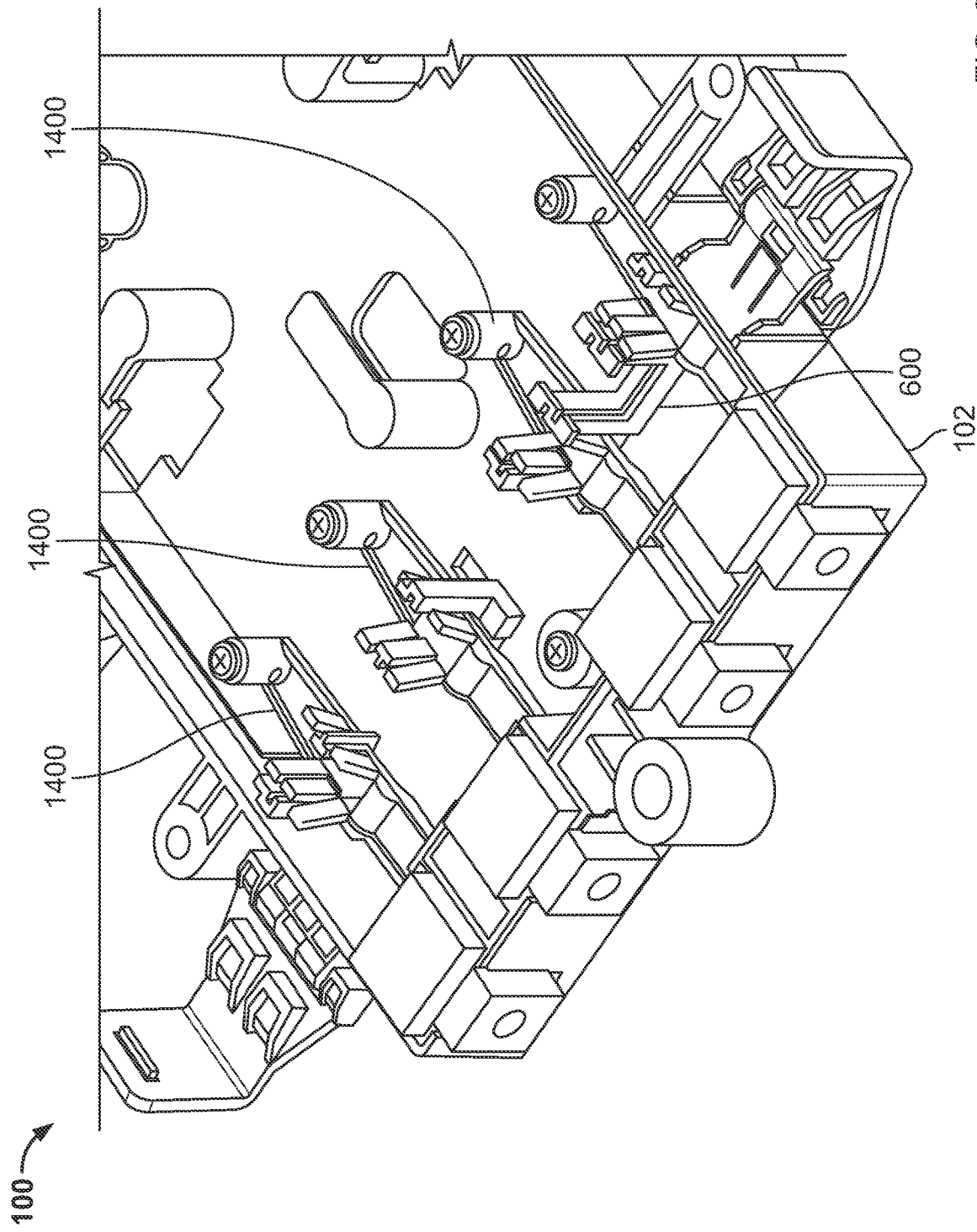

CABLE RESTRAINTS FOR SPLICE ENCLOSURES AND SPLICE ENCLOSURES INCLUDING CABLE RESTRAINTS

CROSS REFERENCE TO RELATED APPLICATIONS

This application claims priority to U.S. Provisional Patent Application No. 63/190,778, filed on May 19, 2021, entitled "Cable Restraints for Splice Enclosures and Splice Enclosures Including Cable Restraints," which is hereby incorporated by reference herein.

TECHNICAL FIELD

The instant application is generally directed towards a cable restraint for a splice enclosure through which a cable is to extend and a splice enclosure including such a cable restraint. For example, the instant application is directed towards cable restraint having modular components that can be exchanged in the field with other components to fit a various number of cable types.

BACKGROUND

Cables, such as fiber optic cables for example, are deployed to form a network of communication channels over which computers, telephones, electronic devices, etc. can communicate. To satisfy an ever-growing demand for such communication channels, fiber optic cables often include many individual fibers. An individual fiber from a first fiber optic cable can be selectively connected to another fiber included in a second fiber optic cable at a splice enclosure, which is commonly referred to as a "dome."

Various cable types can be used with splice enclosures. The cable restraint portions of the splice enclosures, along with grommets used to seal an interior space from the ambient atmosphere can be modular such that operators in the field can assemble various components to best suit the cable types and the communication network. Additionally, some cable restraint portions can be designed and manufactured to be selectively attached and detached from the splice enclosure while the cable is attached to the cable restraint.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a cable restraint is located in a splice enclosure to restrain a cable extending into the splice enclosure. The cable restraint includes a tray extending from an open end to a cable storage end. The tray includes a bottom side having an upward facing surface and a tab feature. The open end enables a cable to pass onto the upward facing surface, and the cable storage end provides storage space. The cable restraint also includes a restraint bridge removably attached to the tray. The restraint bridge includes a central portion having a surface configured to cooperate with the tab feature to inhibit relative motion between the restraint bridge and the tray in a direction non-perpendicular to an axis of the cable. A restraint clip is removably attached to the restraint bridge. The restraint clip includes a body portion and a surface defined by the body portion configured to support the cable as the cable passes over the body portion. The restraint clip also includes a restraint post attached to the body portion configured to secure a strength member of the cable to the restraint clip. The restraint clip further includes a column attached to and extending away from the body portion configured to inhibit relative motion between the restraint clip and the restraint bridge in the direction non-perpendicular to the axis of the cable.

According to an aspect, a cable restraint located in a splice enclosure to restrain a cable extending into the splice enclosure includes a tray extending from an open end to a cable storage end. The tray includes a bottom side having an upward facing surface. The tray also includes a first post attached to and extending away from the upward facing surface. The first post defines a first slot. The tray further includes a tab feature, wherein the open end enables a cable to pass onto the upward facing surface, and the cable storage end provides storage space. The cable restraint also includes a restraint bridge removably attached to the tray. The restraint bridge includes a central portion having a surface configured to cooperate with the tab feature to inhibit relative motion between the restraint bridge and the tray in a direction non-perpendicular to an axis of the cable. The restraint bridge also includes a second post attached to and extending away from the central portion. The second post is configured to apportion a space above the central portion for the cable to pass through.

According to an aspect, a splice enclosure includes a housing defining an interior space. The splice enclosure also includes a cap provided to the housing to seal the interior space. At least one of the cap or the housing defines a first aperture through which a cable extends between an ambient environment and the interior space. At least one of the housing or the cap define a second aperture adjacent to the first aperture. The splice enclosure also includes a grommet that seals a space between a sidewall of at least one of the housing or the cap that defines the first aperture and an exterior surface of the cable extending into the interior space. The grommet is selectively moved from a first position where the grommet is positioned at least partially within the second aperture to a second position where the grommet is not positioned within the second aperture.

The following description and annexed drawings set forth certain illustrative aspects and implementations. These are indicative of but a few of the various ways in which one or more aspects may be employed. Other aspects, advantages, and/or novel features of the disclosure will become apparent from the following detailed description when considered in conjunction with the annexed drawings.

DESCRIPTION OF DRAWINGS

FIG. 28 is a detail view of an example restraint clip and restraint bridge arrangement.

DETAILED DESCRIPTION

Figure 1:
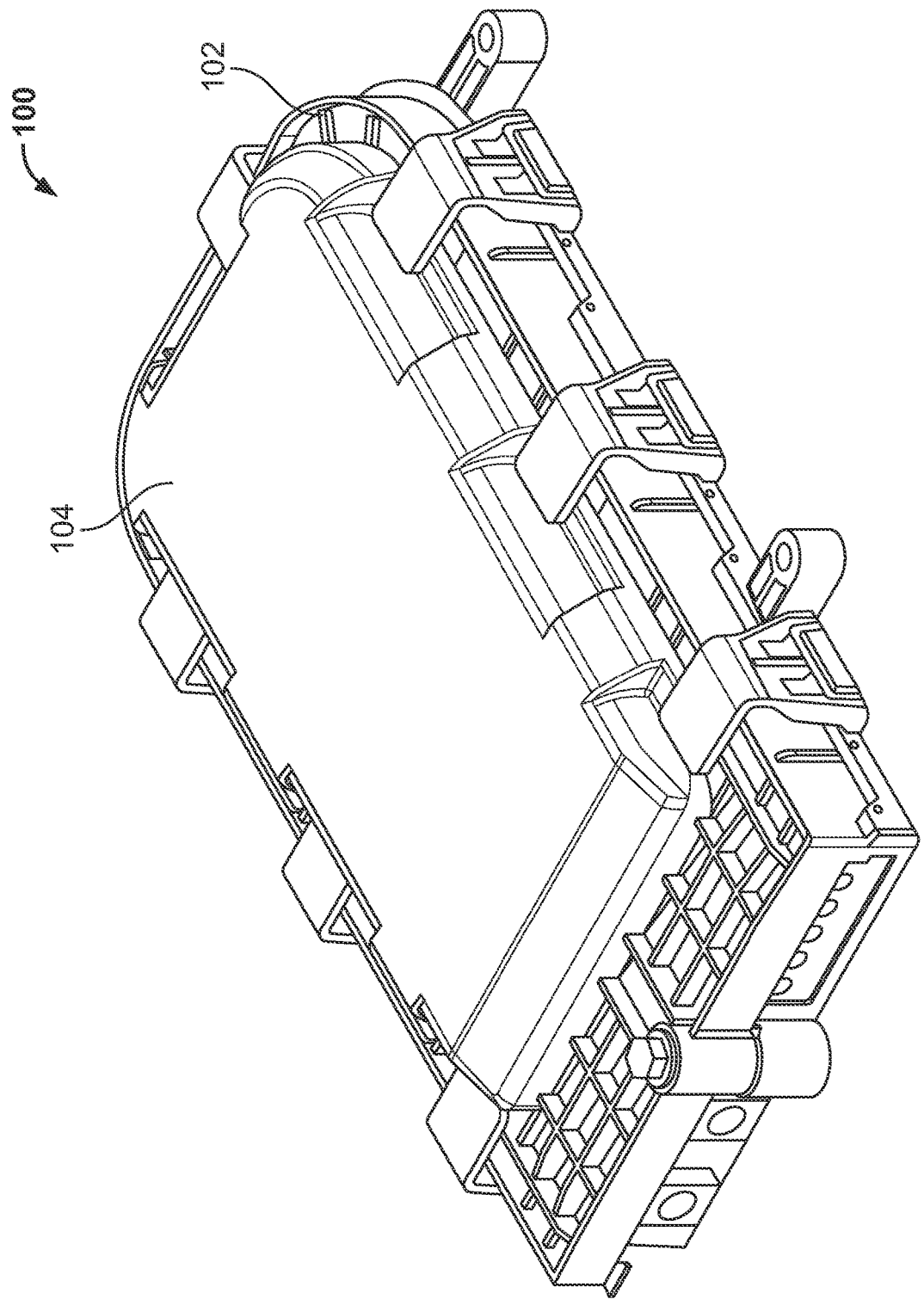
FIG. 1 illustrates an example splice enclosure.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

A splice enclosure includes a housing defining an interior space in which a connection between a first cable and a second cable is to be supported. A cap, lid, or other similar structure encloses the interior space and includes a first port through which the first cable enters the interior space and a second port through which the second cable enters the interior space. Because a contaminant such as water, dirt or other debris within the interior space can interfere with the connection between the first cable and second cable, or degrade components of the splice enclosure, the first port and second port are sealed by grommets.

A cable restraint for supporting the cable along a length both within the interior space and/or along a length outside the splice enclosure is disclosed herein in addition to a splice enclosure enabling modular selection of grommets. For some embodiments, the cable restraint can be selectively attached and detached from the splice enclosure even if the cable is attached to the cable restraint. For some embodiments, one or more grommets can be used to seal an interface between the cable and a portion of the splice enclosure. These grommets can be interchangeable in the field to produce a splice enclosure adapted for use to specific types and numbers of cable. Additionally, as disclosed herein, portions of the cable restraint can also be interchangeable to suit the styles and numbers of cables associated with the splice enclosure.

Referring now to the drawings, FIG. 1 is a perspective view of an embodiment of a splice enclosure 100. The illustrated embodiment of the splice enclosure 100 includes a housing 102 that defines an interior space 200 (shown in FIG. 2) in which a connection between at least a first cable 202 (shown in FIG. 2) and a second cable 204 (shown in FIG. 2) is to be enclosed. The housing 102 is formed from any suitably-durable material that can withstand the environmental conditions where the splice enclosure 100 is to be installed. An example of a material for the housing 102 includes, but is not limited to, plastics such as ultraviolet-resistant, thermosetting polymers, and the like.

A cap 104, lid, or similar structure encloses an opening formed in the housing 102, leading into the interior space. Embodiments of the cap 104 cooperate with the opening formed in the housing 102 leading into the interior space. Some embodiments of the cap 104 include a compressible gasket (not shown), facilitating the formation of an air-tight enclosure as a result of cooperation between the housing 102 and the cap 104, at atmospheric pressure, or up to a threshold pressure that is greater than atmospheric pressure. For example, embodiments of the threshold pressure can be at least 20 psi, or at least 25 psi, or at least 30 psi, or at least 35 psi, or at least 40 psi, etc.

It is to be appreciated that, within some examples, the housing 102 and/or the cap 104, and portions thereof, may be pre-existing structures. Within some examples, the housing 102 and/or the cap 104, and portions thereof, may be of pre-existing design. Within some examples, the housing 102 and/or the cap 104, and portions thereof, may be new structures. Within some examples, the housing 102, the cap 104, and/or portions thereof, may be of a new design. As such, it is to be appreciated that the specifics of the housing 102, the cap 104 and/or portions thereof need not be limitations upon the present disclosure.

Figure 2:
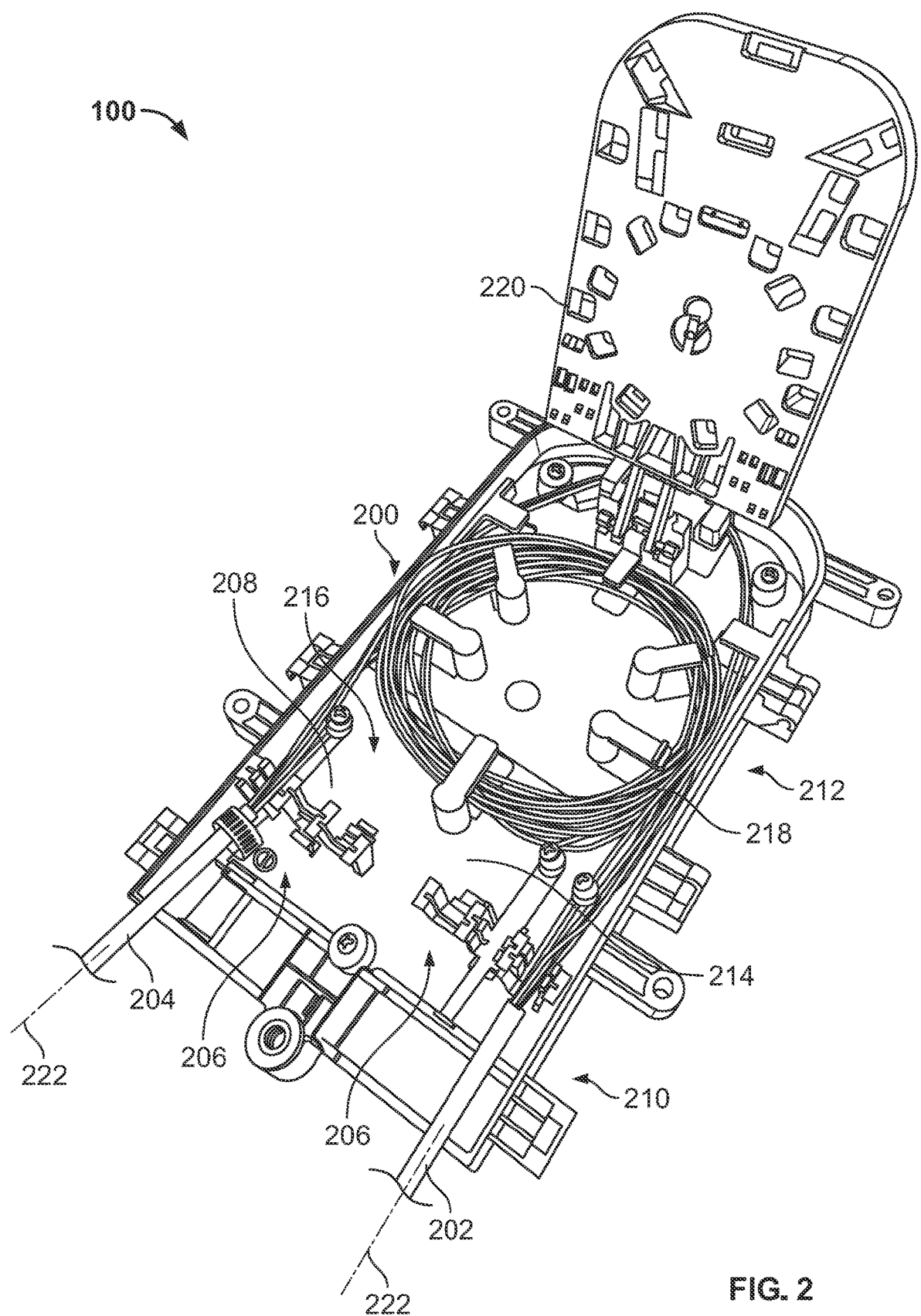
FIG. 2 illustrates an example splice enclosure.

Referring to FIG. 2, a perspective view of the splice enclosure is illustrated with the cap 104 removed in order to show the contents of the interior space 200. The first cable 202 and the second cable 204 are shown as fiber optic cables within a flexible, dielectric jacket. However, according to some embodiments, the first cable 202 and the second cable 204 are optical ground wire "OPGW" cables introduced into the housing 102 through ports as described herein, or any other such cable. The OPGW cables include one or more optical fibers within a tubular jacket, which is surrounded by one or more layers of conductive wire helically wound about the tubular jacket. The OPGW cables extend between towers supporting electrical power lines, and connect the towers to earth ground. For the sake of brevity and clarity, however, the first cable 202 and the second cable 204 are described herein as fiber optic cables for the purposes of the present disclosure.

It is to be appreciated that, within some examples, the housing 102 and/or the cap 104, and portions thereof, may be pre-existing structures. Within some examples, the housing 102 and/or the cap 104, and portions thereof, may be of pre-existing design. Within some examples, the housing 102 and/or the cap 104, and portions thereof, may be new structures. Within some examples, the housing 102, the cap 104, and/or portions thereof, may be of a new design. As such, it is to be appreciated that the specifics of the housing 102, the cap 104 and/or portions thereof need not be limitations upon the present disclosure.

Remaining with FIG. 2, a cable restraint 206 is located in the splice enclosure 100 to restrain the first cable 202 and the second cable 204 extending into the splice enclosure 100. The cable restraint 206 includes a tray 208 that extends from an open end 210 to a cable storage end 212. The tray 208 includes a bottom side 214 having an upward facing surface 216. The open end 210 enables the first cable 202 and the second cable 204 to pass onto the upward facing surface 216 while the cable storage end 212 provides storage space. In some examples, the storage space is used to coil individual fiber optic fibers 218 often referred to as "slack." In some examples, the slack fiber optic fibers 218 enter the splice enclosure 100 in the first cable 202, pass through the storage space, and exit the splice enclosure 100 in the second cable 204. Each of the first cable 202 and the second cable 204 can extend along an axis that, for the purposes of this disclosure, can be considered to be perpendicular to the open end 210 of the tray 208.

Figure 3:
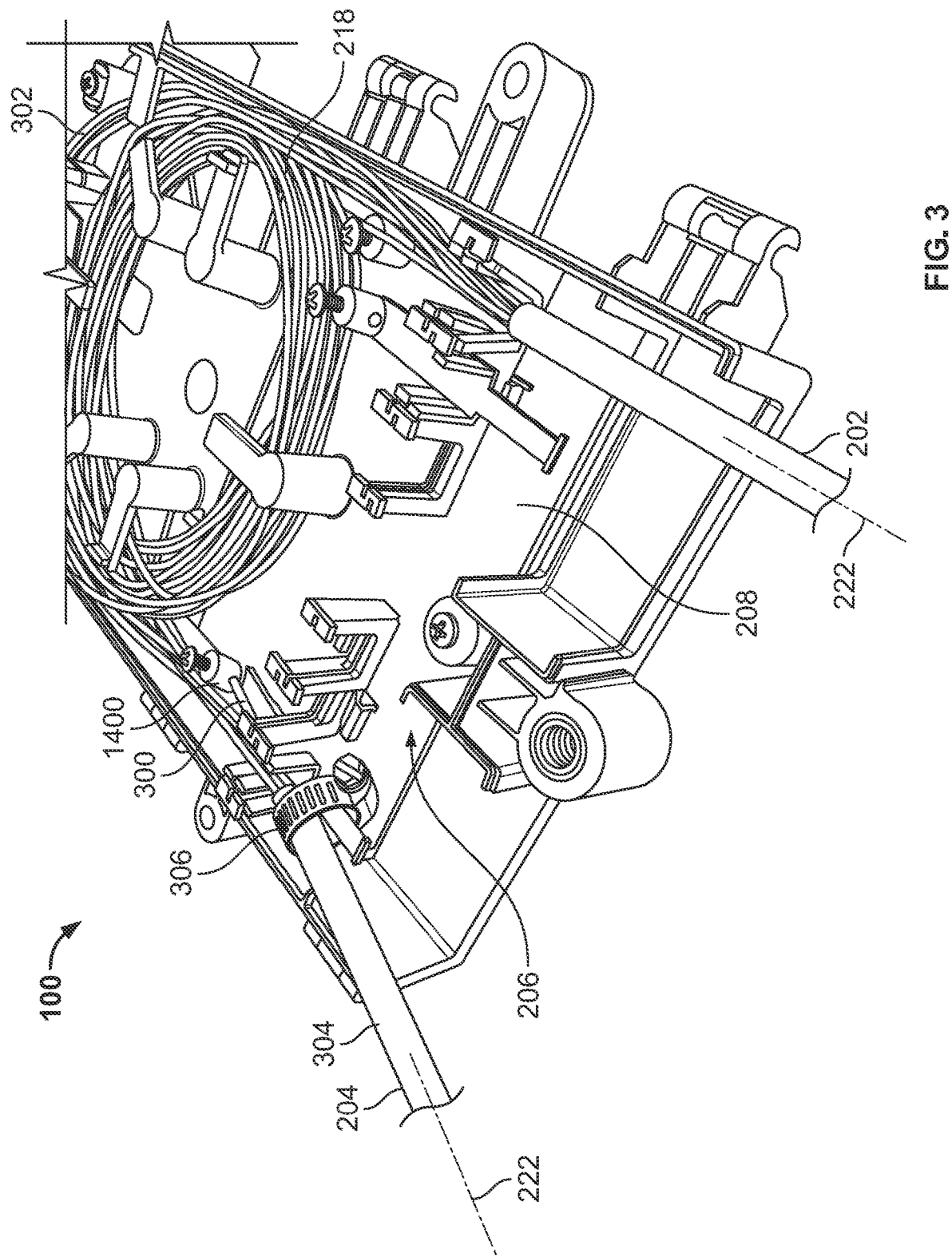
FIG. 3 is a detail view of an example splice enclosure.

Referring to FIG. 3, a perspective detail view of the open splice enclosure 100 is illustrated. The first cable 202 and the second cable 204 each include a strength member 300 that can be configured to provide strength to the cable 202, 204 for rigidity, for support in cable suspension applications, etc. Additionally, the first cable 202 and the second cable 204 each include fiber optic fibers 302 that are routed away from the storage space in order to be routed to one or more splice trays 220 (shown in FIG. 2) within the splice enclosure 100. The fiber optic fibers 218 (e.g., the slack), the strength member 300, and the fiber optic fibers 302 routed to splice trays 220 are all included in an exterior cable wrap or sheath 304.

Figure 4:
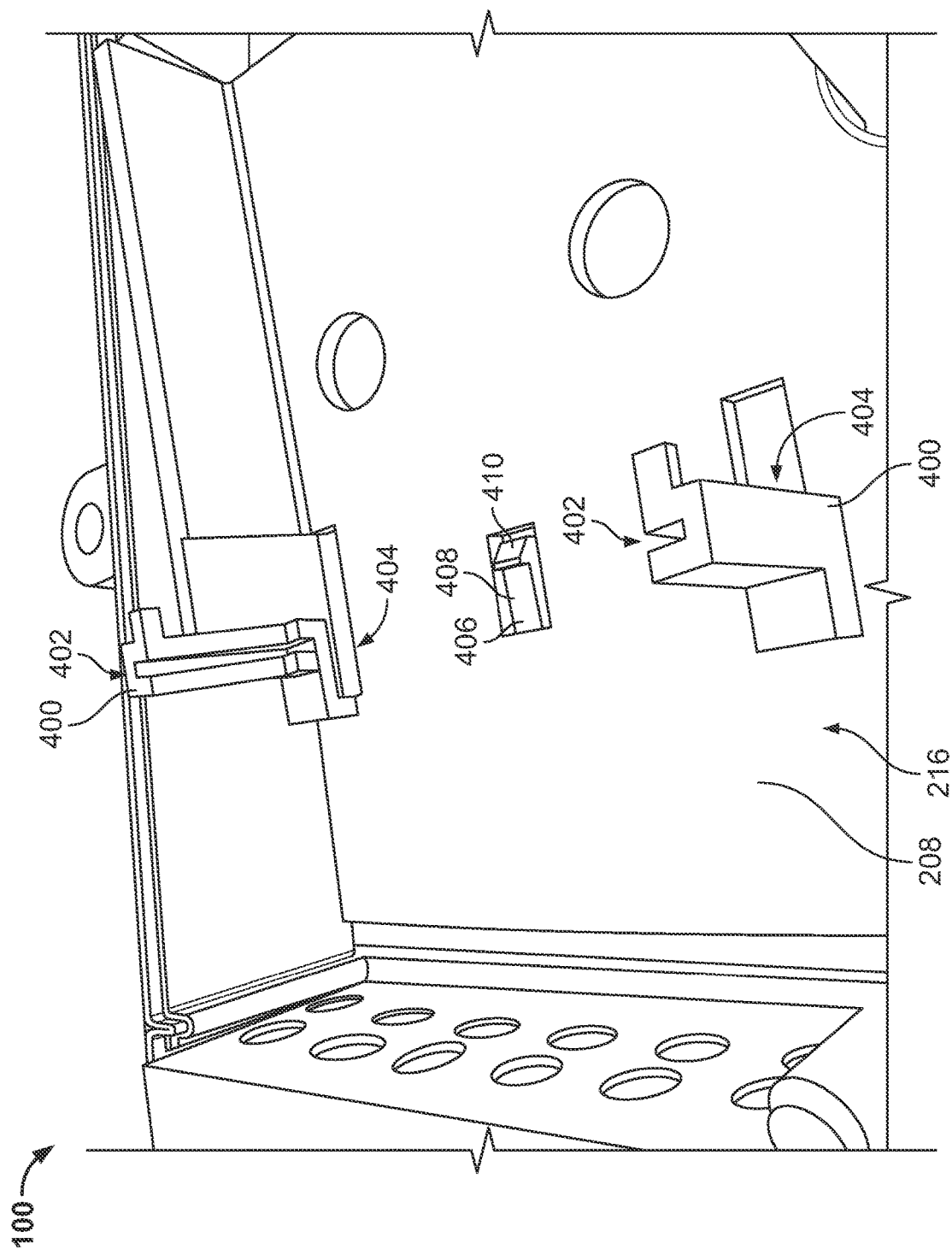
FIG. 4 is a detail view of a tray within a splice enclosure.

Referring to FIG. 4, a detail view of the tray 208 is illustrated. The tray 208 includes a first post 400 attached to and extending away from the upward facing surface 216. The first post 400 defines a first slot 402. In some examples, the first slot is perpendicular to the upward facing surface 216 as shown in the figure, however, this is not meant to be limiting. In some examples, there can be multiple first posts 400 arranged in pairs and defining first slots 402 that face each other for insertion of a component to be described below. Of course, other examples are contemplated, and the pairing arrangement of first posts 400 and first slots 402 is not required.

Additionally, the bottom side 214 and the first post 400 can together define an attachment structure such as an undercut 404 between the first post 400 and the upward facing surface 216 of the bottom side 214. This undercut 404 or open space can enable another portion of the cable restraint 206 assembly to be located between the first post 400 and the upward facing surface 216.

The tray 208 also includes a locking or "snap-in" structure such as a tab feature 406 that can be an integral part of the tray 208. In other examples, the tab feature 406 can be a separate part attached to the tray 208. As shown, the tab feature 406 can include a flat portion 408 extending from the bottom side 214 of the tray 208 and terminate in a wedge-like structure 410. In some examples, at least one of the tab feature 406 or the joint between the tab feature 406 and the bottom side 214 can provide flexibility such that a downward force on the wedge-like structure can elastically deform the tab feature 406 in a direction into the bottom side 214 and then revert to the shown position after the downward force is removed.

Figure 5:
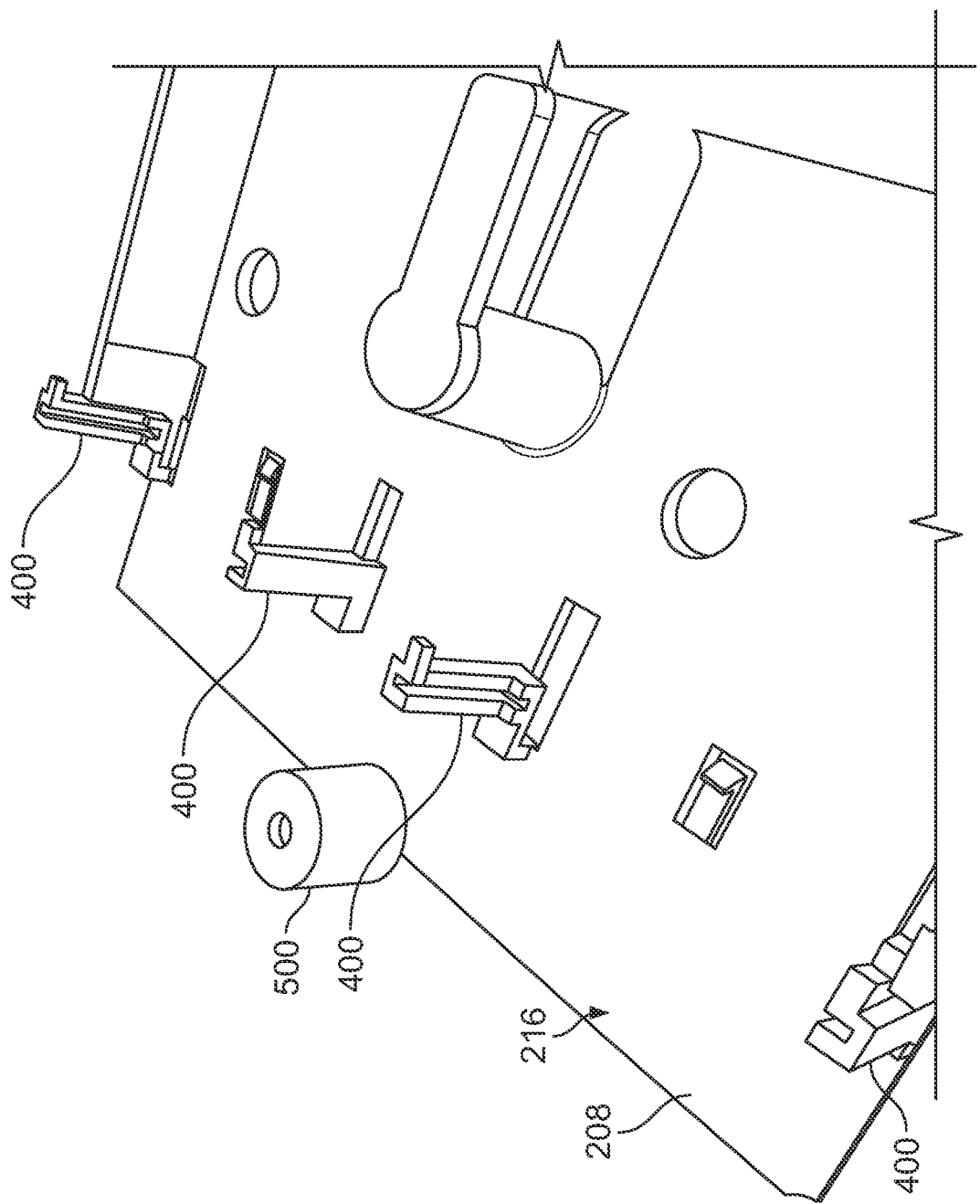
FIG. 5 is a detail view of the tray.

Referring to FIG. 5, the tray 208 can be of any number of sizes and shapes. In some examples, the tray 208 includes a boss 500 that can be used in conjunction with a threaded fastener (not shown). The boss 500 can be located such that the threaded fastener can interact with threaded fasteners located in existing styles of housings 102 (shown in FIG. 1) such that the tray 208 can be retrofitted into existing splice enclosures 100 (shown in FIG. 1). FIG. 5 also illustrates the relationship of four first posts 400 into two related pairs (e.g., the two first posts on the right form one pair and the two first posts on the left form a second pair).

Figure 6:
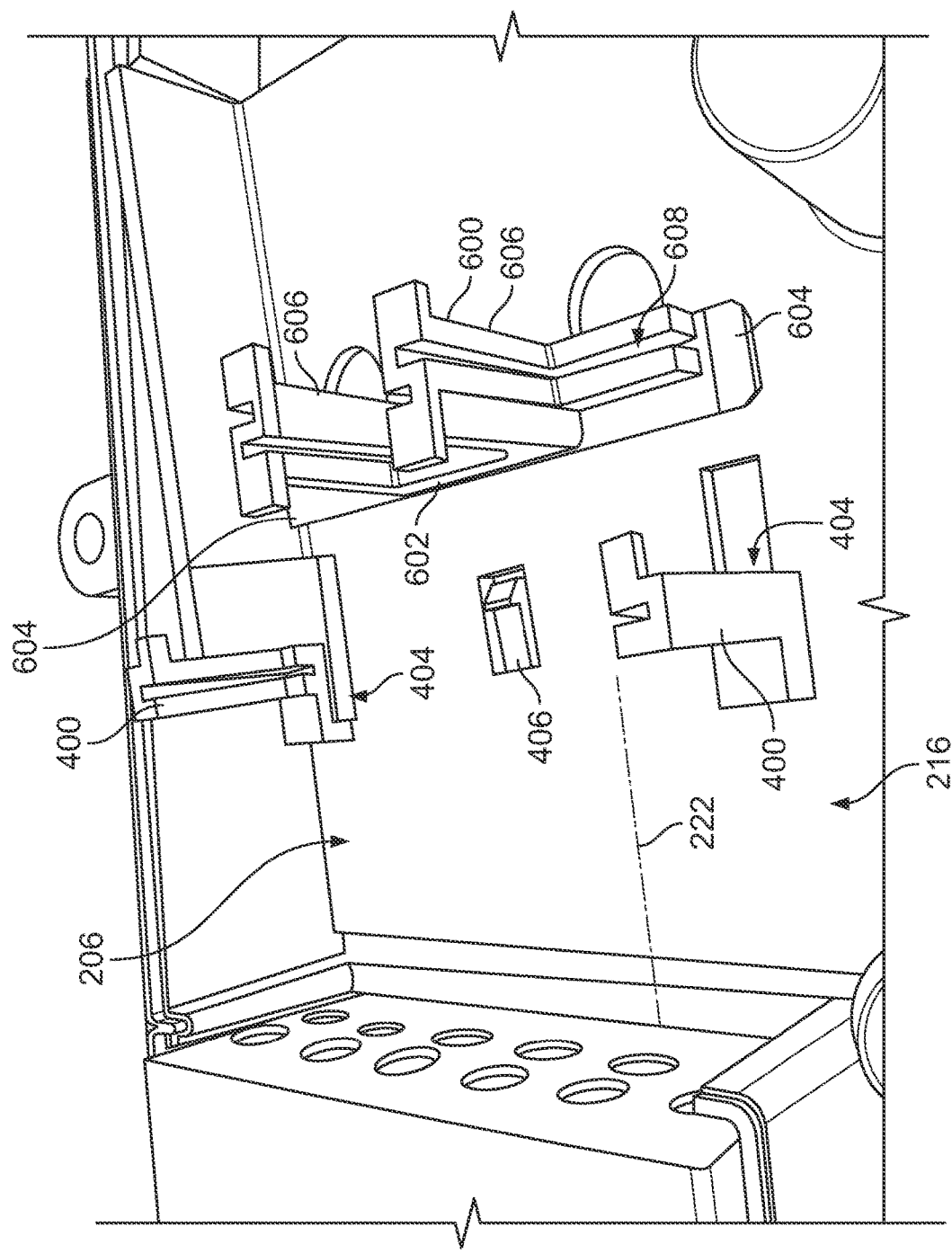
FIG. 6 is a detail view of the tray and a restraint bridge in a first position.

Referring to FIG. 6, the cable restraint 206 can include a restraint bridge 600, The restraint bridge 600 includes a central portion 602 serving as a body or frame for the remainder of the restraint bridge 600. The central portion 602 can include ends 604 that are configured to cooperate with the attachment structure of the tray 208 such as the undercut 404. The relatively thin cross-section of the ends 604 can be located within the open space of the undercut 404 between the first post 400 and the upward facing surface 216.

The restraint bridge also includes a second post 606 that is attached to the central portion 602 and extends away from the central portion 602. In the shown example, the second post 606 can be perpendicular to the central portion 602, although other angles are also contemplated. The second post 606 can apportion a space above the central portion 602 for the cable 202, 204 to pass through, helping to segregate the cables 202, 204 as they enter and exit the splice enclosure 100.

Additionally, the second post 606 defines a second slot 608, and in some examples, the second slot 608 is also defined, at least for a portion of its length, by the central portion 602. The second slot 608 can cooperate with a rib feature to be described below.

The restraint bridge 600 can be removably attached to the tray 208 as will be described. The restraint bridge 600 is shown in a first position that is detached from the tray 208. The restraint bridge 600 is attached to the tray and detached from the tray 208 by moving the restraint bridge 600 in a direction parallel or a direction non-perpendicular to the axis 222 of the cable 202, 204. As shown in FIG. 6, the restraint bridge 600 and the tab feature 406 are both located in a first position. In the first position, the restraint bridge 600 is detached from the tray 208, e.g., relative motion between the restraint bridge 600 and the tray 208 is not inhibited. The first position of the tab feature 406 indicates the tab feature 406 is not flexed or elastically bent away from the upward facing surface 216.

Figure 7:
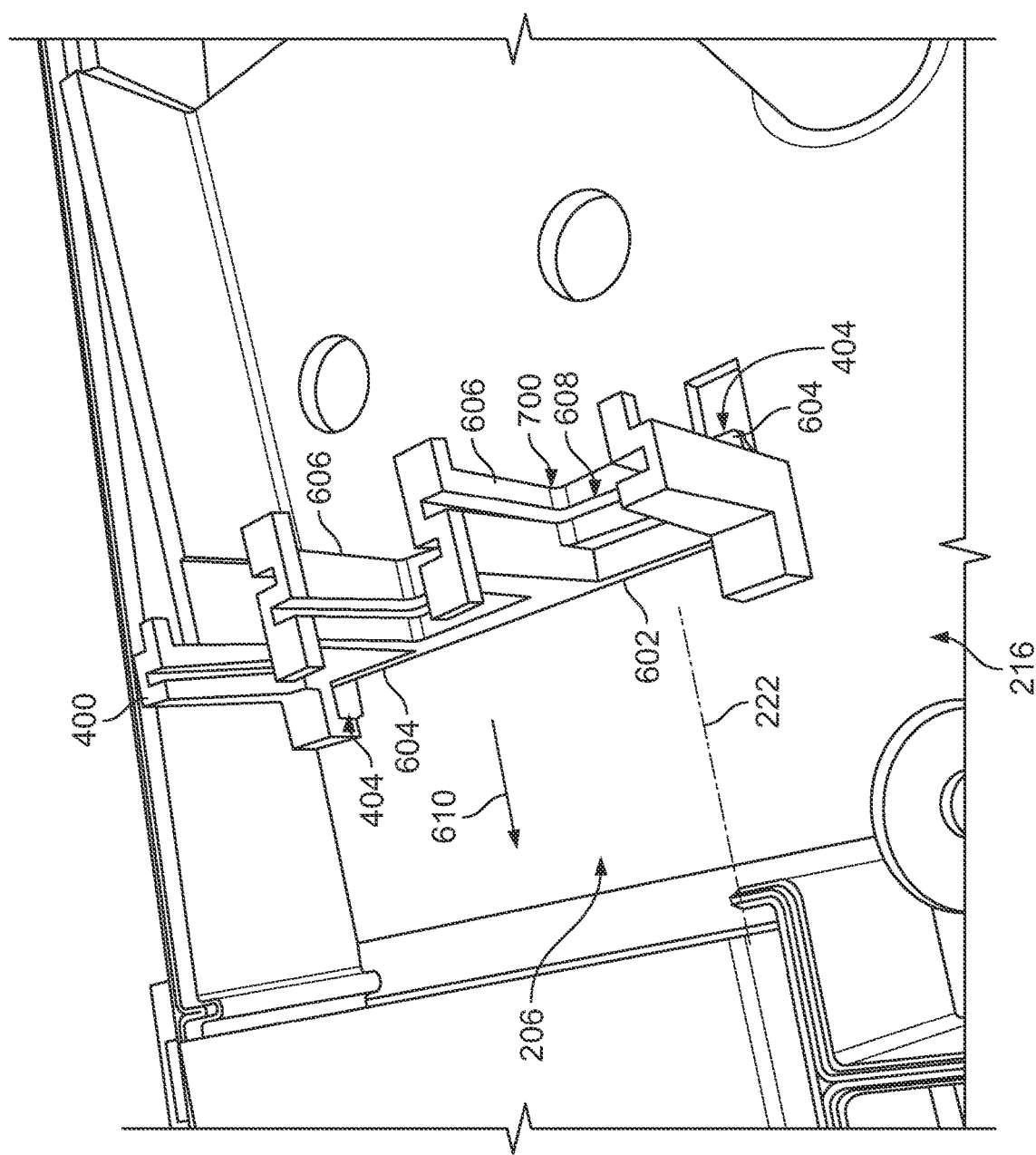
FIG. 7 is a detail view of the restraint bridge in an intermediate position between the first position and a second position.

Referring to FIG. 7, illustrates the restraint bridge 600 in an intermediate position between the first, detached position and a second, attached position. The ends 604 are partially placed within the undercuts 404 as a force (e.g., from an operator's hand) moves the restraint bridge 600 in a direction parallel or a direction non-perpendicular to the axis 222 of the cable 202, 204. This direction can be represented by the arrow labeled 610 in FIG. 7. When the restraint bridge 600 is in this intermediate position, the tab feature 406 (hidden under the restraint bridge 600) is urged to a second position where it is bent or elastically deformed away from the upward facing surface 216. In other words, a force applied to the tab feature 406 by the restraint bridge 600 elastically deforms the tab feature 406 from the first position to the second position until a rear surface 700 of the central portion 602 of the restraint bridge 600 passes over the tab feature 406 such that the tab feature 406 returns to the first position to secure the restraint bridge 600 to the tray 208.

Figure 8:
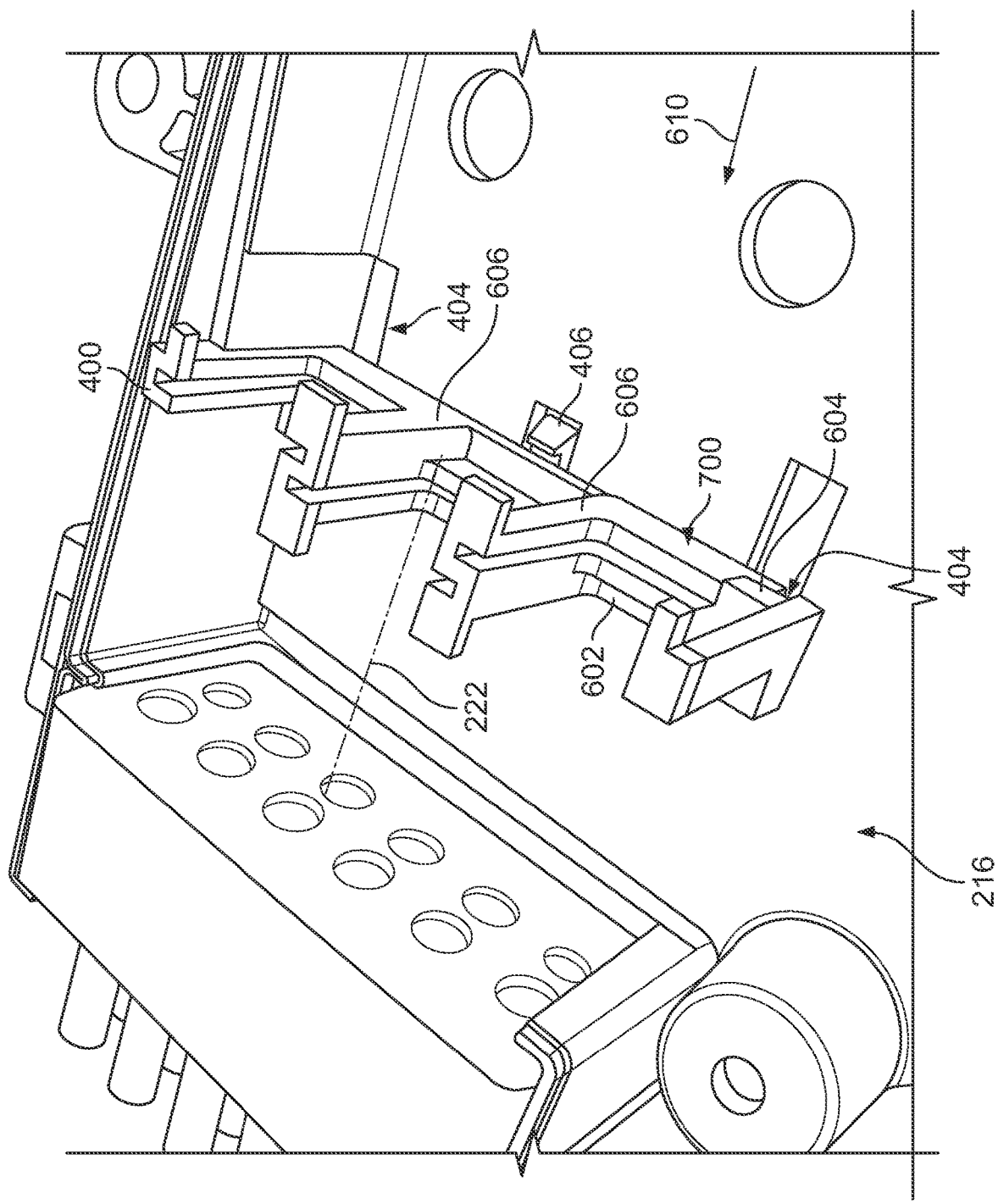
FIG. 8 is a detail view of the restraint bridge in a second position.

Referring to FIG. 8, the restraint bridge 600 is in its second position, attached to the tray 208, while the tab feature 406 is located in its first, unflexed, position. Cooperation between the rear surface 700 and the tab feature 406 inhibit relative motion between the restraint bridge 600 and the tray 208 in a direction parallel or a direction non-perpendicular to the axis 222 of the cable 202. Similarly, as previously discussed, a portion of the central portion 602 of the restraint bridge 600 (e.g., the ends 604) located in the undercut 404 inhibits relative motion between the restraint bridge 600 and the tray 208 in a direction perpendicular to the upward facing surface 216. Additionally, FIG. 8 shows the cooperation between the tab feature 406 and the rear surface 700 of the central portion 602 of the restraint bridge 600 cooperating to provide a snap fit to secure the restraint bridge 600 to the tray 208. In other words, moving the restraint bridge 600 to the second, attached, position, the tab feature 406 can snap into place, giving the operator a tactile and audible indication of proper location of the restraint bridge 600 in the second position.

Figure 9:
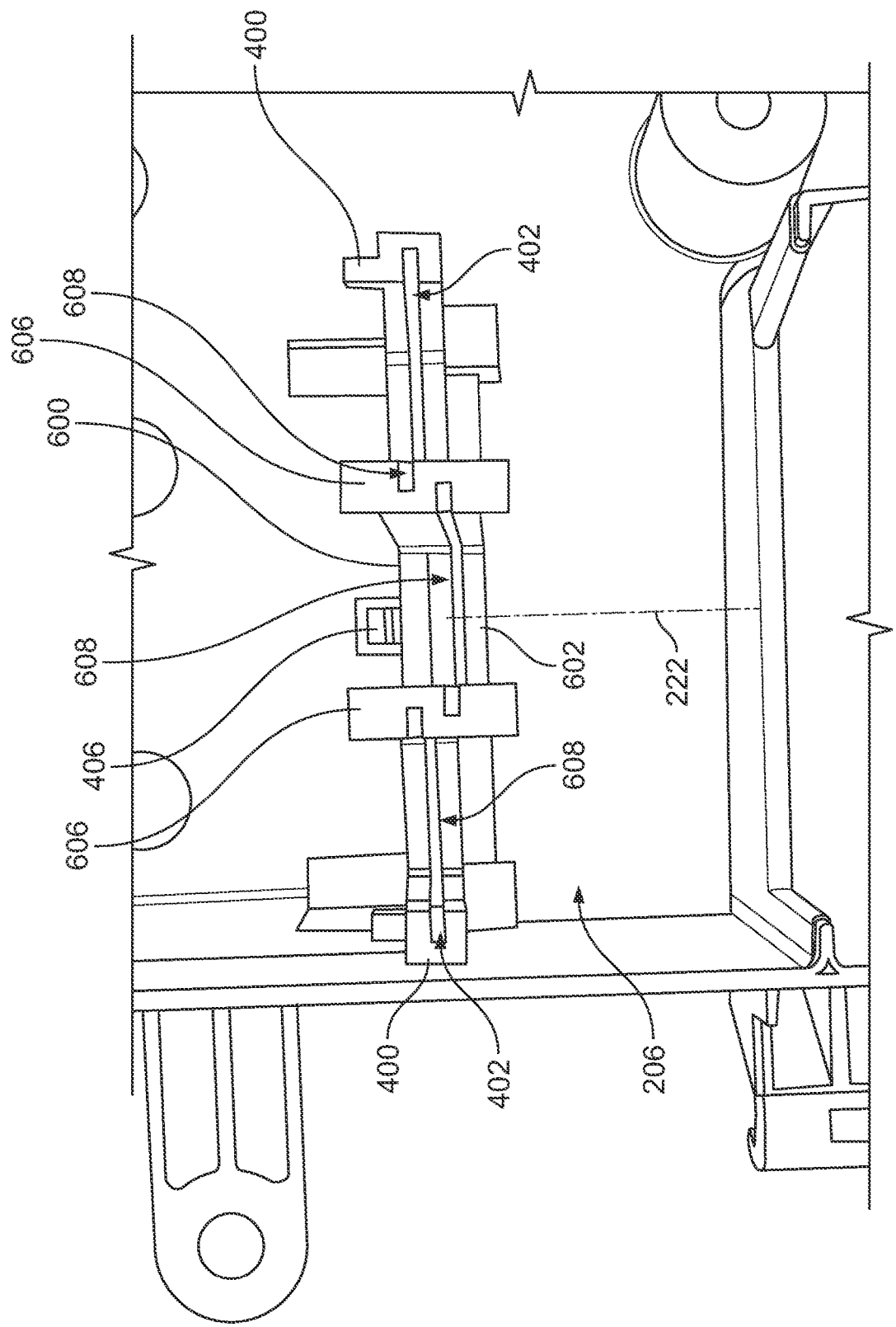
FIG. 9 is a top view of the restraint bridge in the second position.

Referring to FIG. 9, a top view of the restraint bridge 600 is shown while in the second position. As shown, the first slot 402 and the second slot 608 can provide sections that are offset in a direction parallel or a direction non-perpendicular to the axis 222 of the cable 202. One advantage to the offset can be providing an offset for restraint clips that will be discussed below.

Figure 10:
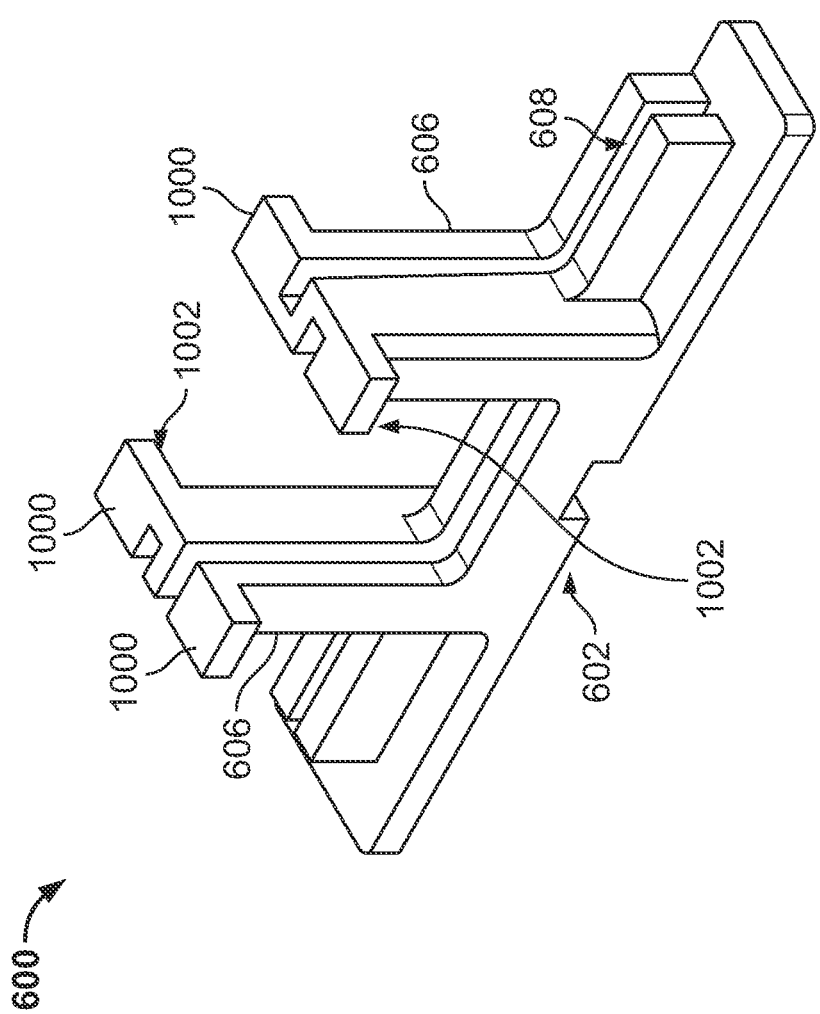
FIG. 10 is a view of an example restraint bridge.

Referring to FIG. 10, a perspective view of an example restraint bridge is shown. The restraint bridge 600 of FIG. 10 includes features previously discussed including the central portion 602, the second post 606, and the second slot 608. The restraint bridge 600, specifically the second post 606, can also include a tab 1000 extending away from the second post 606. The tab 1000 can define a tab surface 1002 which can be the underside of the tab 1000. In some examples, the restraint bridge 600 of FIG. 10 can be used for feed and branch cables with square or rectangular grommets as will be described below.

Figure 11:
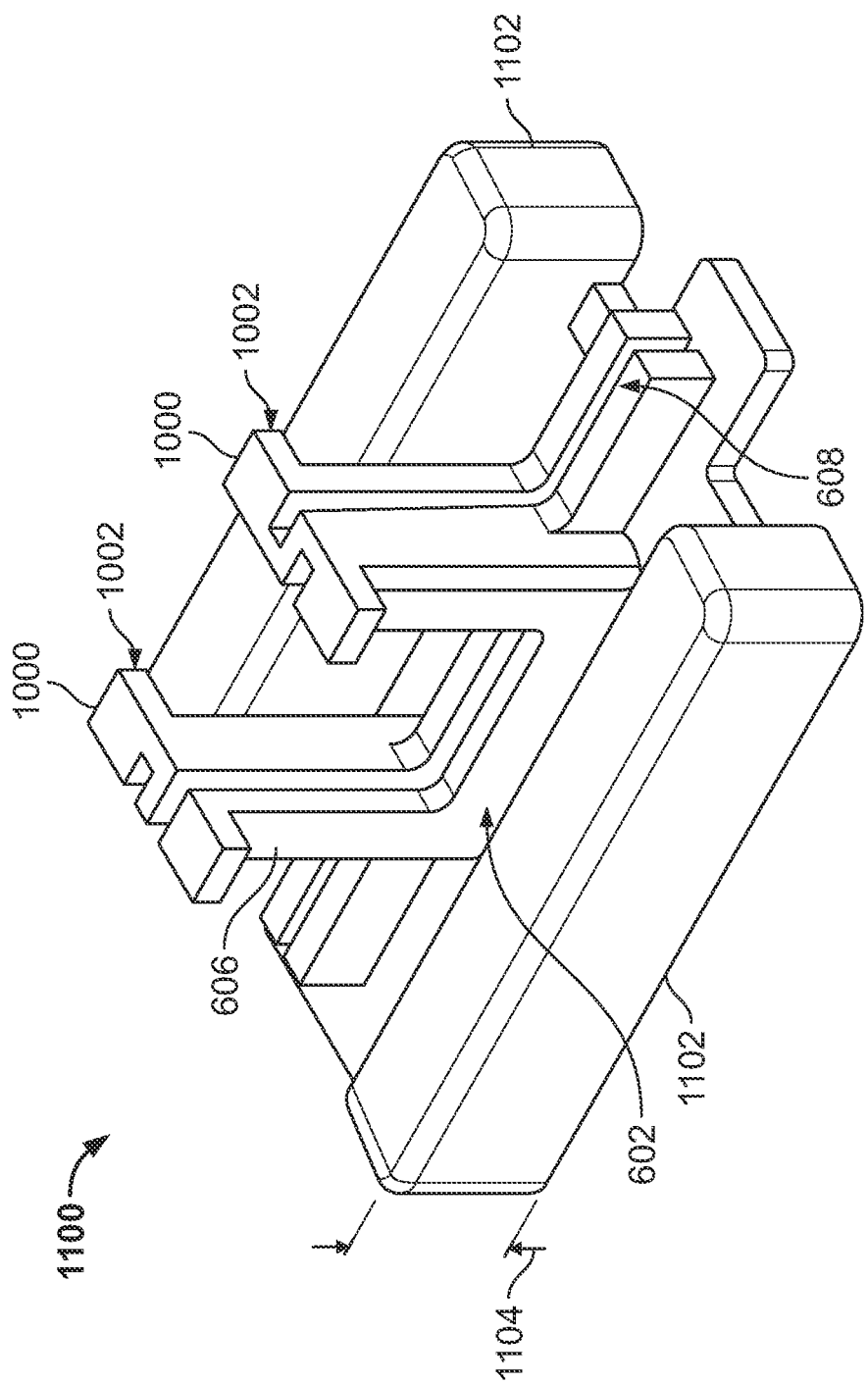
FIG. 11 is a view of an example restraint bridge including bars.

Referring to FIG. 11, a perspective view of an example restraint bridge is shown. The restraint bridge 1100 of FIG. 11 includes features previously discussed including the central portion 602, the second post 606, and the second slot 608. The restraint bridge 1100, can also include a tab 1000 extending away from the second post 606. The tab 1000 can define a tab surface 1002 which can be the underside of the tab 1000. The restraint bridge 1100 can include a bar 1102 configured to provide a separation distance 1104 between the cable 202 (not shown in FIG. 11) and the upward facing surface 216 of the tray 208. In some examples, it may be beneficial to maintain the cable 202 at a particular separation distance 1104 from the tray 208 in order to minimize cable 202 deflection during the application of a sheath clip which will be described below. Otherwise, the restraint bridge 1100 is similar to the restraint bridge 600 and further details of the restraint bridge 1100 will not be discussed. Of course, many variations of the restraint bridges 600, 1100 can be utilized with the tray cable restraint 206 and the splice enclosure 100 to meet the needs of the communication network and the cables used with the particular splice enclosure 100. In some examples, the restraint bridge 1100 of FIG. 11 can be used for drop cables with rectangular grommets as will be described below.

Figure 12:
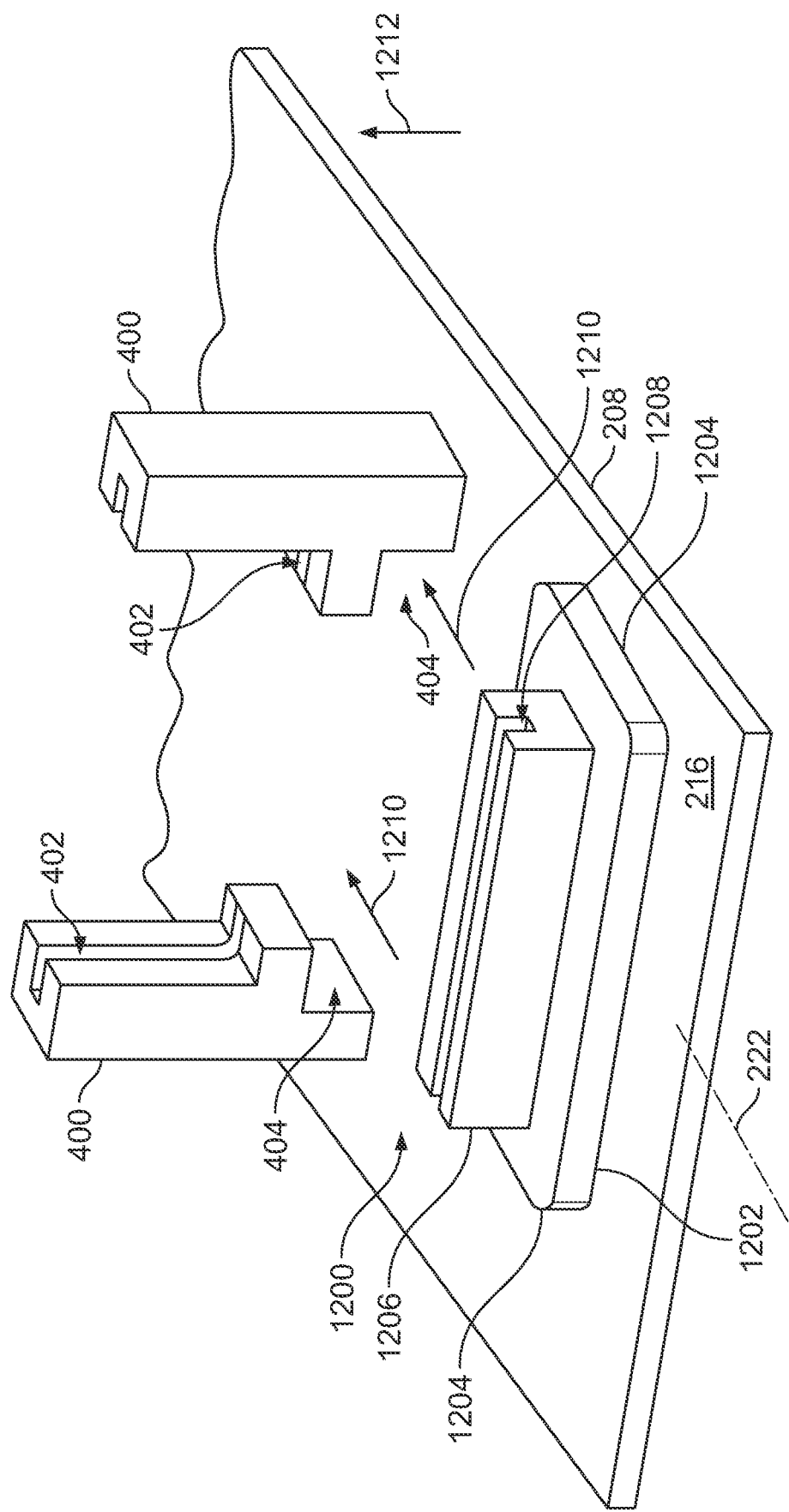
FIG. 12 is a view of an example restraint bridge.

Referring to FIG. 12, a perspective view of another example restraint bridge is shown. As shown, there are some examples of restraint bridges such that the restraint bridge 1200 does not include a second post 606 (shown in FIG. 11). The restraint bridge 1200 can include a base 1202 structure having ends 1204 that are configured to cooperate with the attachment structure of the tray 208 such as the undercut 404. The relatively thin cross-section of the ends 1204 can be located within the space of the undercut 404 between an attachment structure such as the first post 400 and the upward facing surface 216. In some examples, the first post 400 is an integral part of the tray 208, similar to previously described examples.

The restraint bridge 1200 can include a central portion 1206 that defines a second slot 1208. The second slot 1208 can be aligned with the first slot 402 of the first post 400 such that additional structures may be attached to and aligned with the first posts 400 and the restraint bridge 1200. Such additional structures will be further described below.

As with previously described examples, the restraint bridge 1200 can be moved from a first position to a second position (e.g., attached to the tray 208) while a tab feature cooperates with the restraint bridge 1200 to help inhibit relative motion between the restraint bridge 1200 and the tray 208 in a direction 1210, generally parallel or in a direction non-perpendicular to the axis 222 of the cable 202. Similarly, as previously discussed, a portion of the restraint bridge 1200 (e.g., the ends 1204) located in the undercut 404 inhibits relative motion between the restraint bridge 1200 and the tray 208 in a direction 1212 generally perpendicular to the upward facing surface 216.

Additionally, as with previously described examples, the restraint bridge 1200 can cooperate with a tab feature (not shown) to provide a snap fit to secure the restraint bridge 1200 to the tray 208. In other words, moving the restraint bridge 1200 to the second, attached, position, the tab feature can snap into place, giving the operator a tactile and audible indication of proper location of the restraint bridge 1200 in the second position. The lack of the second post 606 on the restraint bridge 1200 can be, in some examples, beneficial to accommodate particular cables or other elements that can be used in cooperation with the first slot 402 and the second slot 1208. As such, the restraint bridge 1200 and tray 208 can be included in a splice enclosure 100 (shown in FIG. 1) such that the splice enclosure 100 includes a first post 400 but does not include a second post 606.

Figure 13:
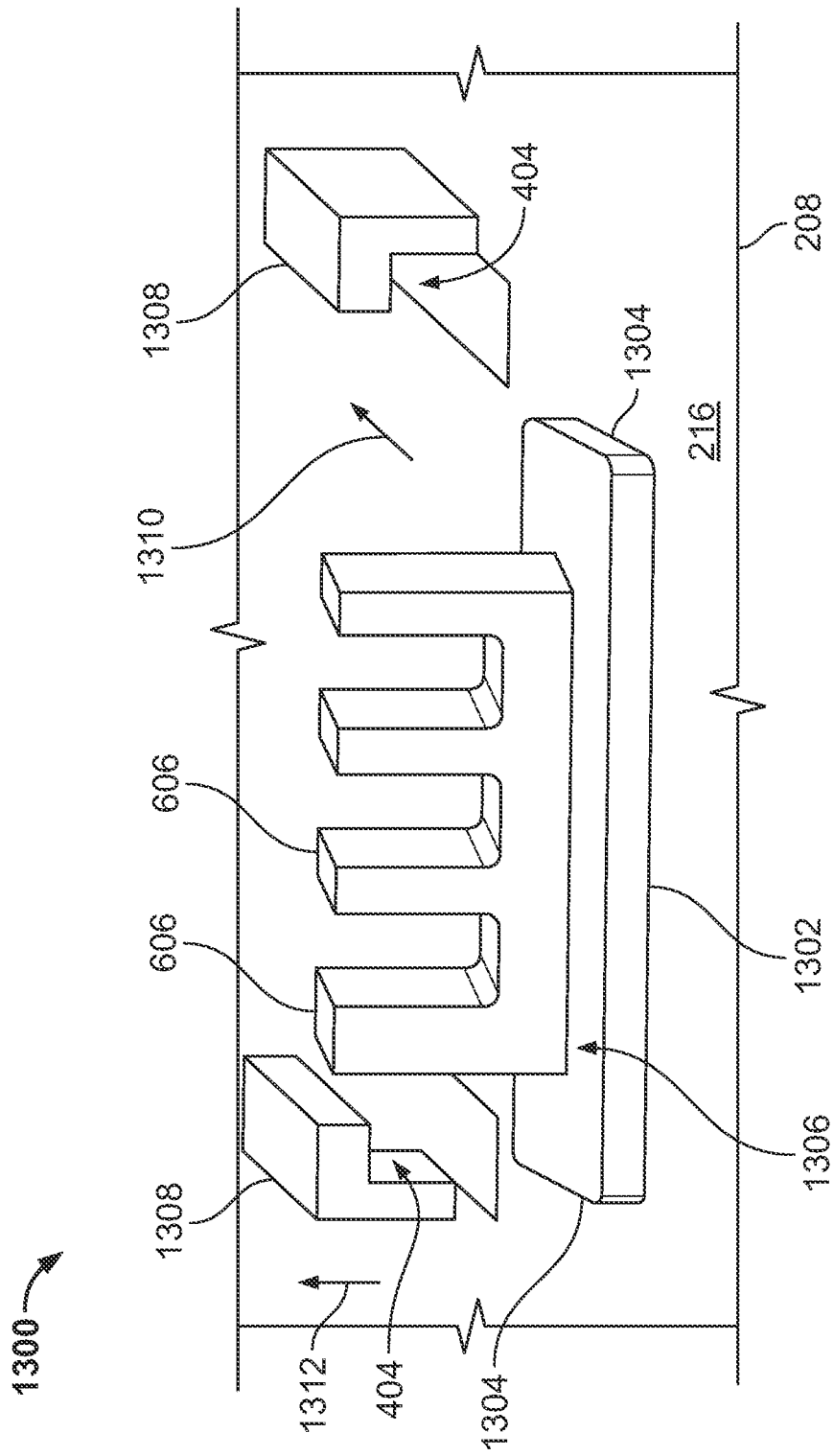
FIG. 13 is a view of an example restraint bridge.

Referring to FIG. 13, a perspective view of yet another example restraint bridge is shown. As shown, there are some examples of restraint bridges 1300 such that the tray 208 does not include a first post 400 (shown in FIG. 12). The restraint bridge 1300 can include a base 1302 structure having ends 1304 that are configured to cooperate with the attachment structure of the tray 208 such as the undercut 404. The restraint bridge 1300 can include a central portion 1306 having a second post 606. As such, the restraint bridge 1300 and tray 208 can be included in a splice enclosure 100 (shown in FIG. 1) such that the splice enclosure 100 includes a second post 606 but does not include a first post 400.

The relatively thin cross-section of the ends 1304 can be located within the space of the undercut 404 between an attachment structure such as a tab 1308 and the upward facing surface 216 of the tray. In some examples, the tab 1308 is an integral part of the tray 208, similar to previously described examples. As with previously described examples, the restraint bridge 1300 can be moved from a first position to a second position (e.g., attached to the tray 208) while a tab feature cooperates with the restraint bridge 1300 to help inhibit relative motion between the restraint bridge 1300 and the tray 208 in a direction 1310, generally parallel or in a direction non-perpendicular to the axis 222 of the cable 202. Similarly, as previously discussed, a portion of the restraint bridge 1300 (e.g., the ends 1204) located in the undercut 404 inhibits relative motion between the restraint bridge 1300 and the tray 208 in a direction 1312 generally perpendicular to the upward facing surface 216.

Additionally, as with previously described examples, the restraint bridge 1300 can cooperate with a tab feature (not shown) to provide a snap fit to secure the restraint bridge 1300 to the tray 208. In other words, moving the restraint bridge 1300 to the second, attached, position, the tab feature can snap into place, giving the operator a tactile and audible indication of proper location of the restraint bridge 1300 in the second position.

Figure 14:
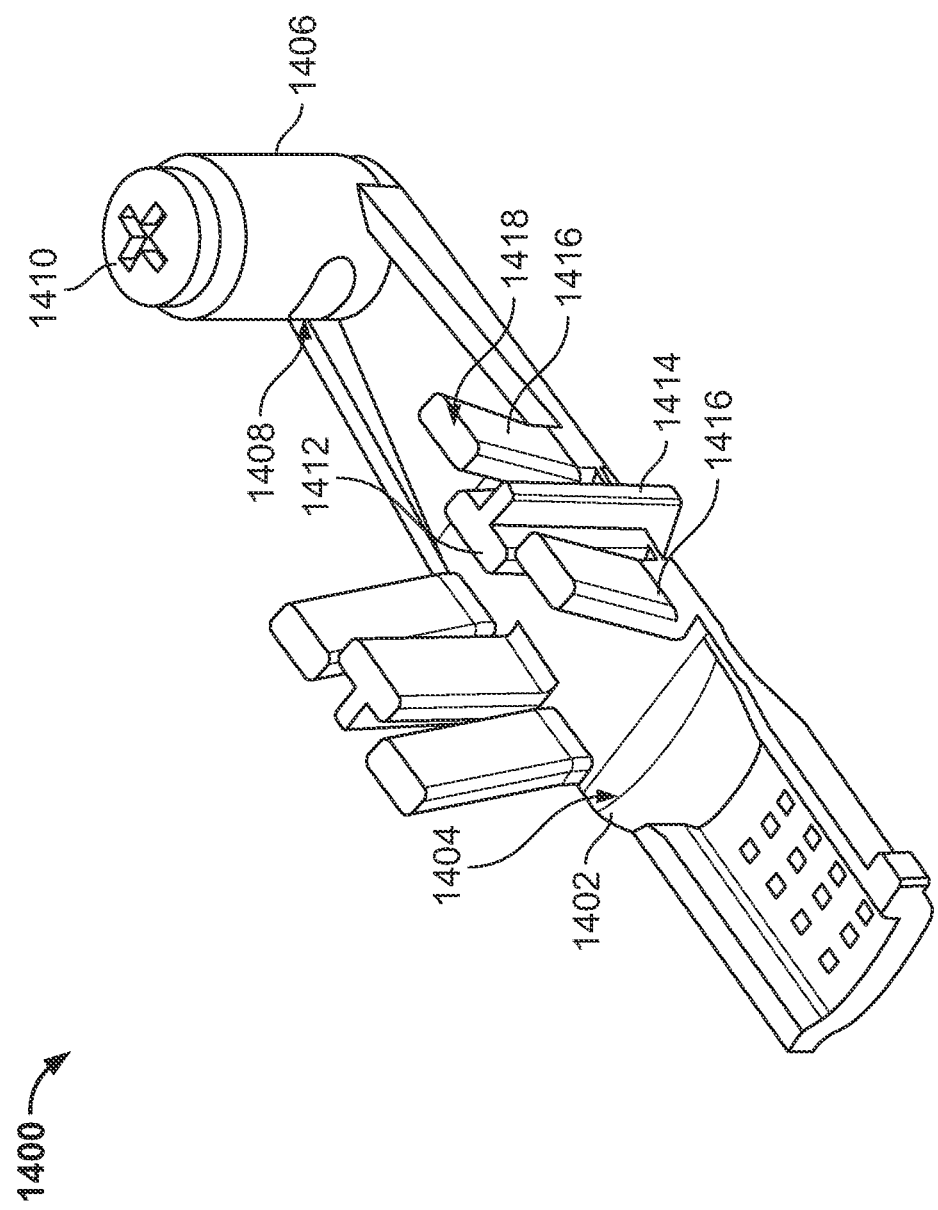
FIG. 14 is a view of an example restraint clip.

Referring to FIG. 14, a perspective view of a restraint clip 1400 is illustrated. The restraint clip 1400 includes a body portion 1402. A surface 1404 defined by the body portion 1402 is configured to support the cable 202, 204 (shown in FIG. 2) as the cable 202, 204 passes over the body portion 1402.

The restraint clip 1400 includes a restraint post 1406 attached to the body portion 1402. The restraint post 1406 is configured to secure the strength member 300 (shown in FIG. 3) of the cable 202, 204 to the restraint clip 1400. In some examples, the restraint post 1406 defines an aperture 1408 such that an end of a strength member 300 of the cable 202, 204 can be removably inserted into the aperture 1408 to secure the cable 202, 204 to the restraint clip 1400.

The restraint post 1406 can include a set screw 1410 movable from a first position to a second position (e.g., threading the set screw into an aperture defined by the restraint post 1406). When in the first position, the set screw 1410 does not secure the strength member 300 to the restraint post 1406 and when in the second position, the set screw 1410 secures the strength member 300 to the restraint post 1406. The set screw 1410 can impinge directly upon the strength member 300 to place a force on the strength member 300 in order to hold the strength member 300 in a single location such that there is no relative motion between the strength member 300 and the restraint clip 1400. The attachment of the strength member 300 to the restraint post 1406 is shown in FIG. 3.

Remaining with FIG. 3, the restraint clip 1400 can include a hose clamp 306 removably attached to the restraint clip 1400 such that the hose clamp 306 secures the cable 202, 204 to the restraint clip 1400. In this arrangement, the combination of the restraint post 1406 and the hose clamp 306 provide two locations of securement of the cable 202, 204 to the restraint clip 1400. This arrangement can inhibit pistoning of the strength member within the cable 202, 204, meaning that with various forces the strength member slides axially within the cable 202, 204 relative to the fiber optic fibers 218, 302 which can add unwanted wear and fatigue to the cable 202, 204 components.

Returning to FIG. 14, the restraint clip 1400 also includes a column 1412 attached to and extending away from the body portion 1402. The column 1412 includes a rib feature 1414 which cooperates with the first slot 402 and the second slot 608, or in some cases, with the second slot 608 alone.

The restraint clip 1400 also includes a flexible finger 1416 attached to and extending away from the body portion 1402 of the restraint clip 1400, the flexible finger 1416 defines a finger surface 1418 configured to cooperate with the tab surface 1002 (shown in FIG. 10). In some examples, the finger surface 1418 is a top side surface of the flexible finger 1416.

Figure 15:
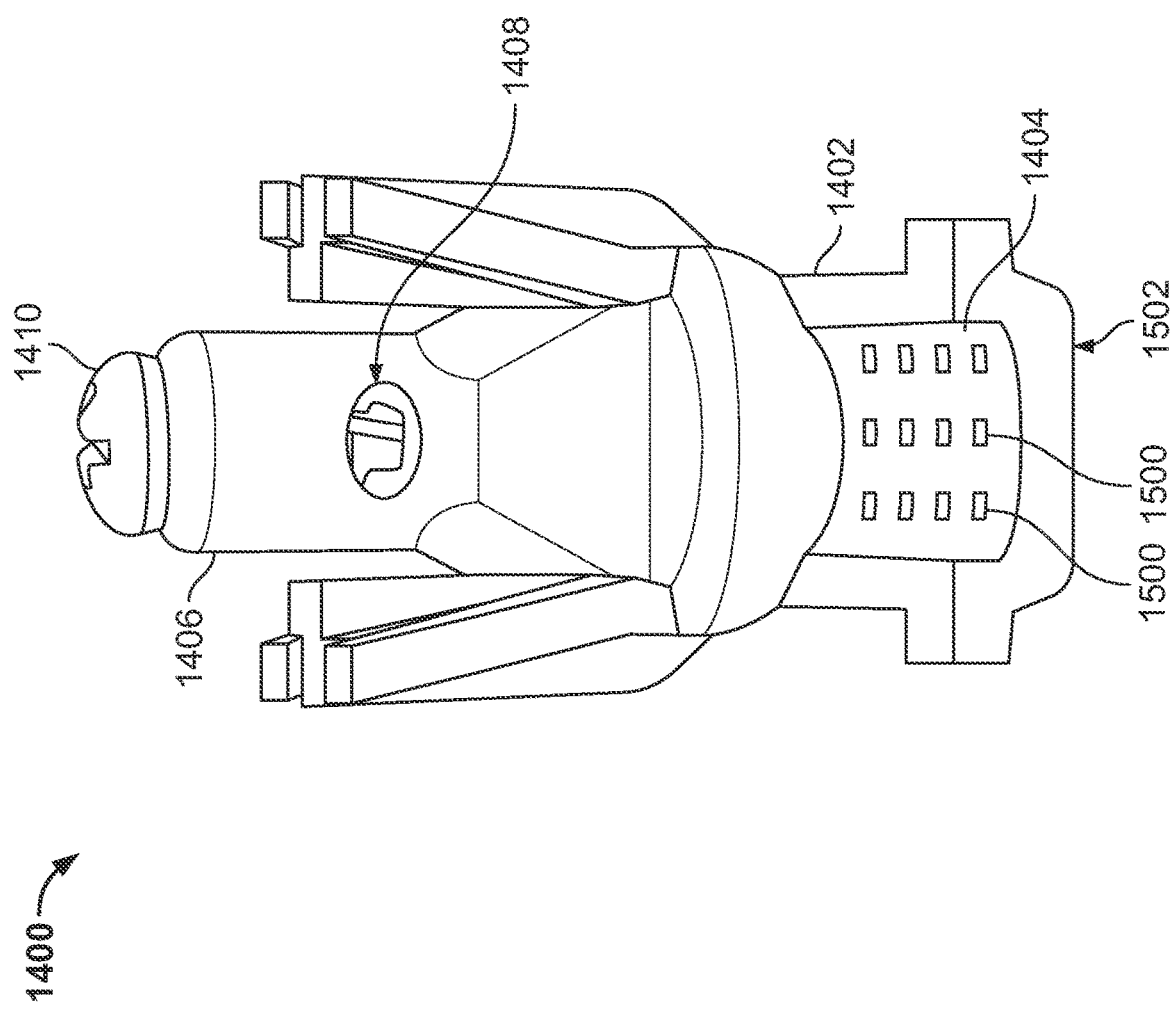
FIG. 15 is an end view of an example restraint clip.

Referring to FIG. 15, an end view of the restraint clip 1400 is illustrated. The end view illustrates the set screw 1410 passing into the aperture 1408 such that the set screw 1410 can impinge upon the strength member 300 as needed to secure the strength member 300 to the restraint post 1406. The end view also illustrates the surface 1404 defined by the body portion 1402 of the restraint clip 1400 can include a pointed feature 1500 configured to impinge on a sheath 304 of the cable 202, 204. This impingement can inhibit (e.g., prevent) relative motion of the cable 202, 204 relative to the restraint clip 1400. Additionally, a portion of the body portion 1402 can include a curved surface 1502 configured to cooperate with a clamp (e.g., the hose clamp 306 shown in FIG. 3) such that the clamp secures the cable 202, 204 to the restraint clip 1400.

Figure 16:
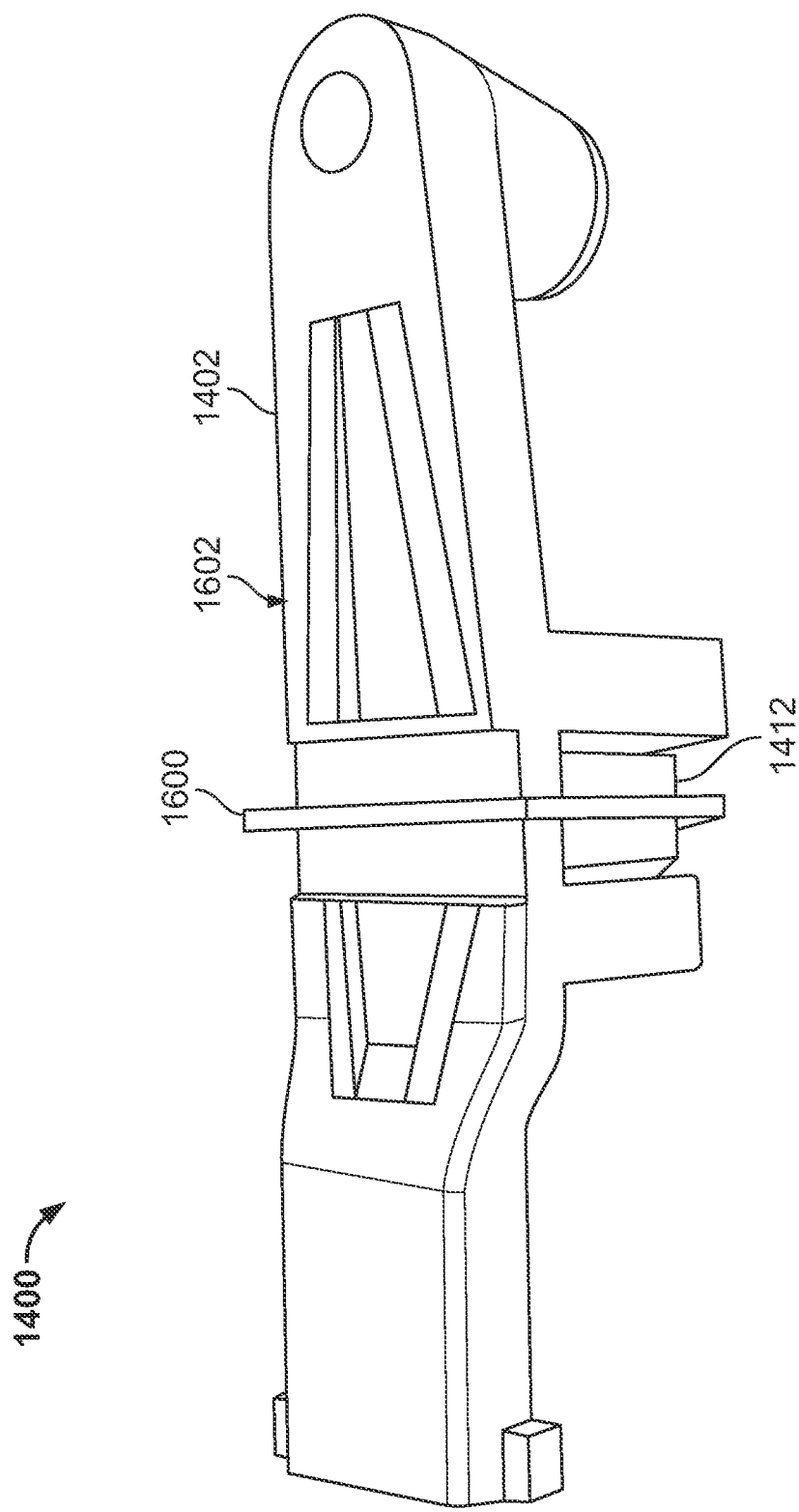
FIG. 16 is a bottom perspective view of an example restraint clip.

Referring to FIG. 16, a bottom perspective view of the restraint clip 1400 is illustrated. The restraint clip 1400 can include a rib feature 1600 spanning not only the column 1412 on each side, but the rib feature 1600 can also extend across a bottom side 1602 of the body portion 1402.

Figure 17:
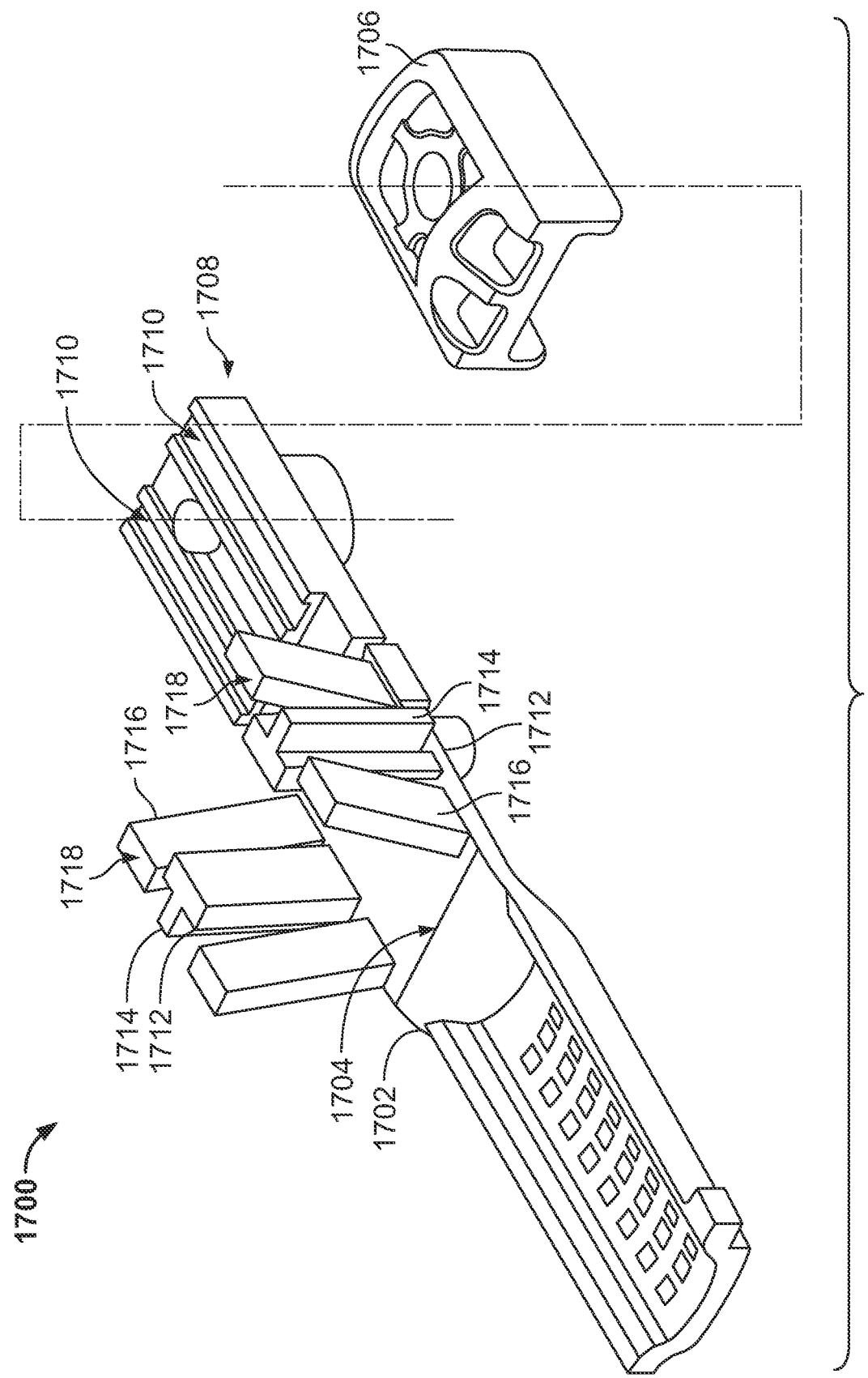
FIG. 17 is a perspective view of an example restraint clip.

Referring to FIG. 17, a perspective view of another example restraint clip 1700 is illustrated. The restraint clip 1700 includes a body portion 1702. A surface 1704 defined by the body portion 1702 is configured to support the cable 202, 204 (shown in FIG. 2) as the cable 202, 204 passes over the body portion 1702.

The restraint clip 1700 includes a restraint post 1706 attached to the body portion 1702, for example, via a threaded fastener (not shown in FIG. 17). For this example restraint clip 1700, the restraint post 1706 is separable from the body portion 1702 and may not be integrally formed or constructed with the body portion 1702. In some examples, an end portion 1708 of the body portion 1702 defines a depression 1710 (or similar structure such as a trough, aperture, etc.) such that an end of a strength member 300 of the cable 202, 204 can be placed within the depression 1710. In some examples, the depression 1710 is a trough that generally runs parallel or non-perpendicular to a direction of the axis 222 of the cable 202, 204. In some examples, it may be advantageous to maximize the surface area of contact between the end of the strength member 300 and the depression 1710 or other surfaces of the restraint clip 1700.

Additionally, it may be advantageous to define or construct the depression 1710 to have a depth that is less than a dimension (e.g., a diameter) of an end of the strength member 300 of the cable 202, 204. After an end of the strength member 300 of the cable 202, 204 is placed within the depression 1710, the restraint post 1706 is then placed above the end portion 1708 to secure the restraint post 1706 to the body portion 1702, such as with a threaded fastener. An applied force between the restraint post 1706 and the body portion 1702 will then fasten, secure, etc. the strength member 300 of the cable 202, 204 to the restraint clip 1700. A securing force between the restraint post 1706 and the body portion 1702 will inhibit (e.g., prevent) relative motion of the cable 202, 204 relative to the restraint clip 1400. Restraint clips 1700 can be designed to define two or more depressions 1710 commensurate with the number of strength members 300 included in any particular cable 202, 204.

Similar to the previously described examples, the restraint clip 1700 also includes a column 1712 attached to and extending away from the body portion 1702. The column 1712 includes a rib feature 1714 which cooperates with the first slot 402 and the second slot 608, or in some cases, with the second slot 608 alone, or in other cases, with the first slot 402 alone.

The restraint clip 1700 also includes a flexible finger 1716 attached to and extending away from the body portion 1702 of the restraint clip 1700. The flexible finger 1716 defines a finger surface 1718 configured to cooperate with the tab surface 1002 (shown in FIG. 10). In some examples, the finger surface 1718 is a top side surface of the flexible finger 1716.

Figure 18:
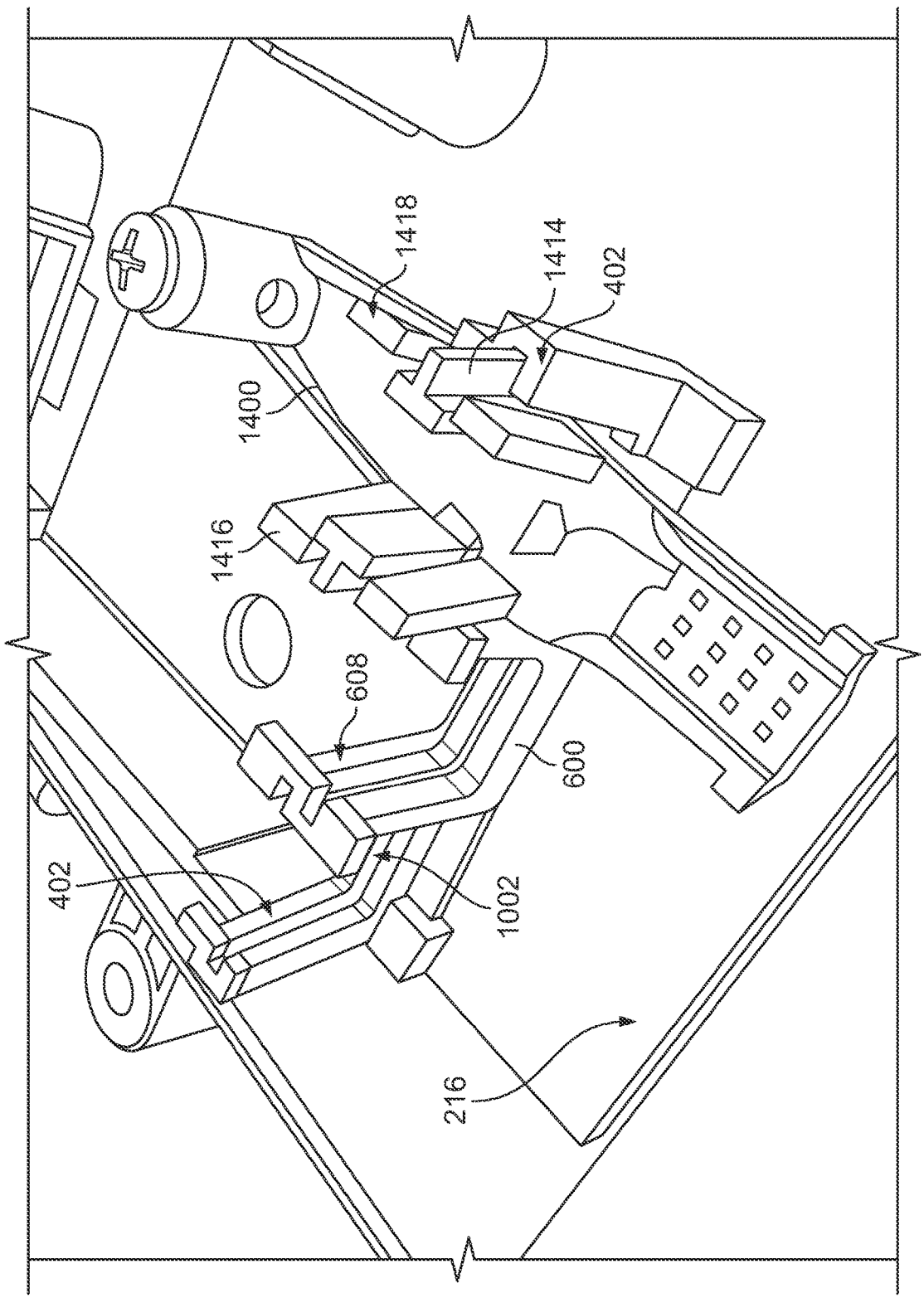
FIG. 18 is a perspective view of the restraint clip in a first position relative to the restraint bridge.

Referring to FIG. 18, the restraint clip 1400 cooperating with the restraint bridge 600 is illustrated. The restraint clip 1400 can be removably attached to the restraint bridge 600. The rib feature 1414 cooperates with at least one of the first slot 402 or the second slot 608 to inhibit relative motion between the restraint clip 1400 and the restraint bridge 600 in the direction generally parallel or a direction non-perpendicular to the axis 222 of the cable 202, 204.

FIG. 18 shows the restraint clip 1400 in a first position where the restraint clip 1400 is not attached to the restraint bridge 600 and relative motion between the restraint bridge 600 and the restraint clip 1400 is not inhibited. An operator can apply a force (e.g., downward force) to urge the restraint clip 1400 to a second position where the restraint clip 1400 is attached to the restraint bridge 600. To foster the attachment and cooperation between the restraint clip 1400 and the restraint bridge 600, the flexible finger 1416 is elastically deformable. As with the tab feature 406, movement of the restraint clip 1400 from the first position to the second position causes the flexible finger 1416 to elastically deform until the finger surface 1418 passes by the tab surface 1002 enabling the flexible finger 1416 to revert to an undeformed position. In the second position, the finger surface 1418 cooperates with the tab surface 1002 to inhibit relative motion between the restraint clip 1400 and the restraint bridge 600 in a direction perpendicular or in a direction non-parallel to the upward facing surface 216.

Figure 19:
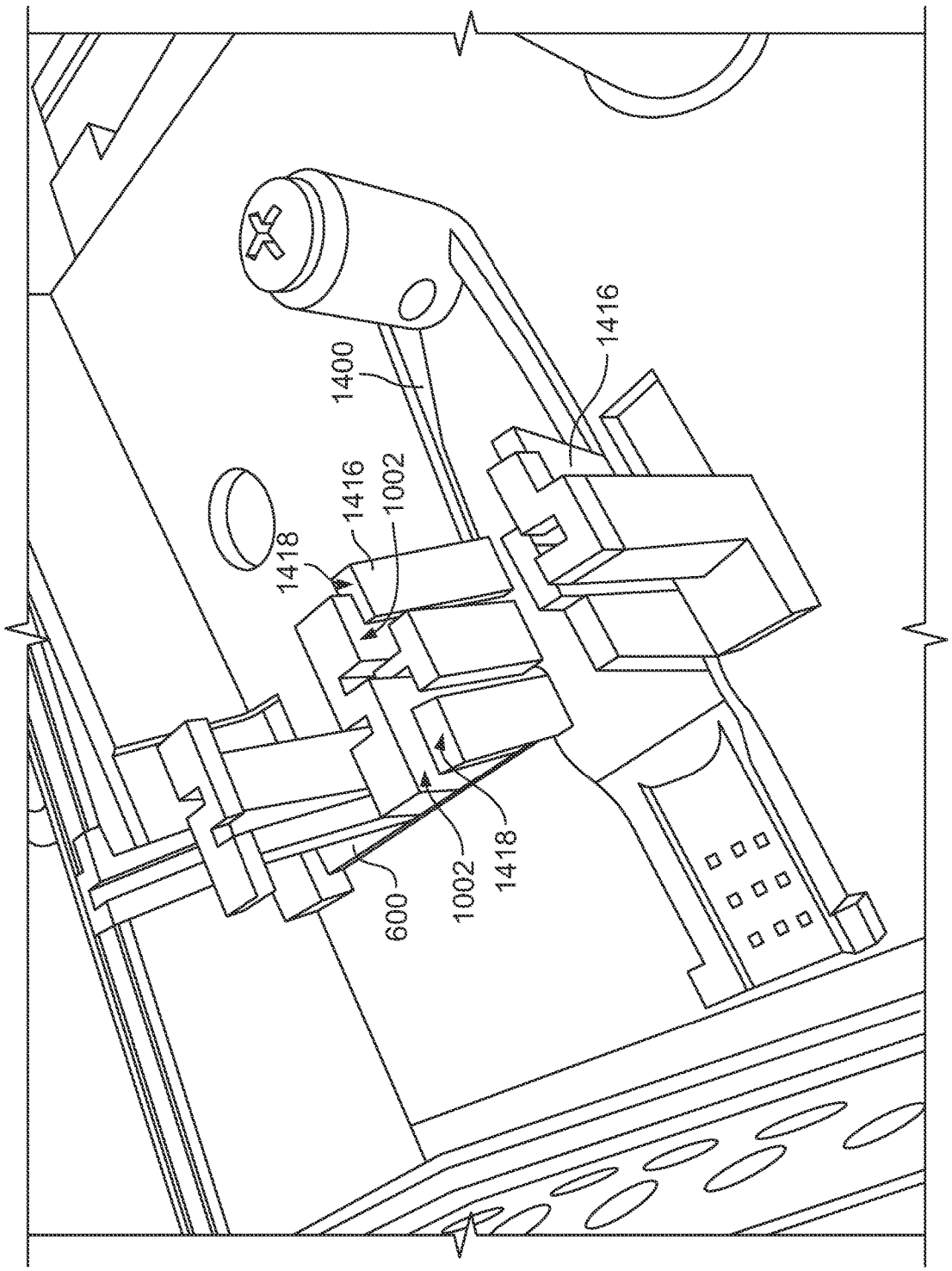
FIG. 19 is a perspective view of the restraint clip in a second position relative to the restraint bridge.

Referring to FIG. 19, the restraint clip 1400 in a second position where the restraint clip 1400 is attached to the restraint bridge 600 is illustrated. In this second position, relative motion between the restraint clip 1400 and the restraint bridge 600 is inhibited. In some examples, the flexible finger 1416 can be elastically deformed to move the finger surface 1418 away from the tab surface 1002 such that the restraint clip 1400 can be at least one of detached from or attached to the restraint bridge 600 while the cable 202, 204 is secured to the restraint clip 1400.

Figure 20:
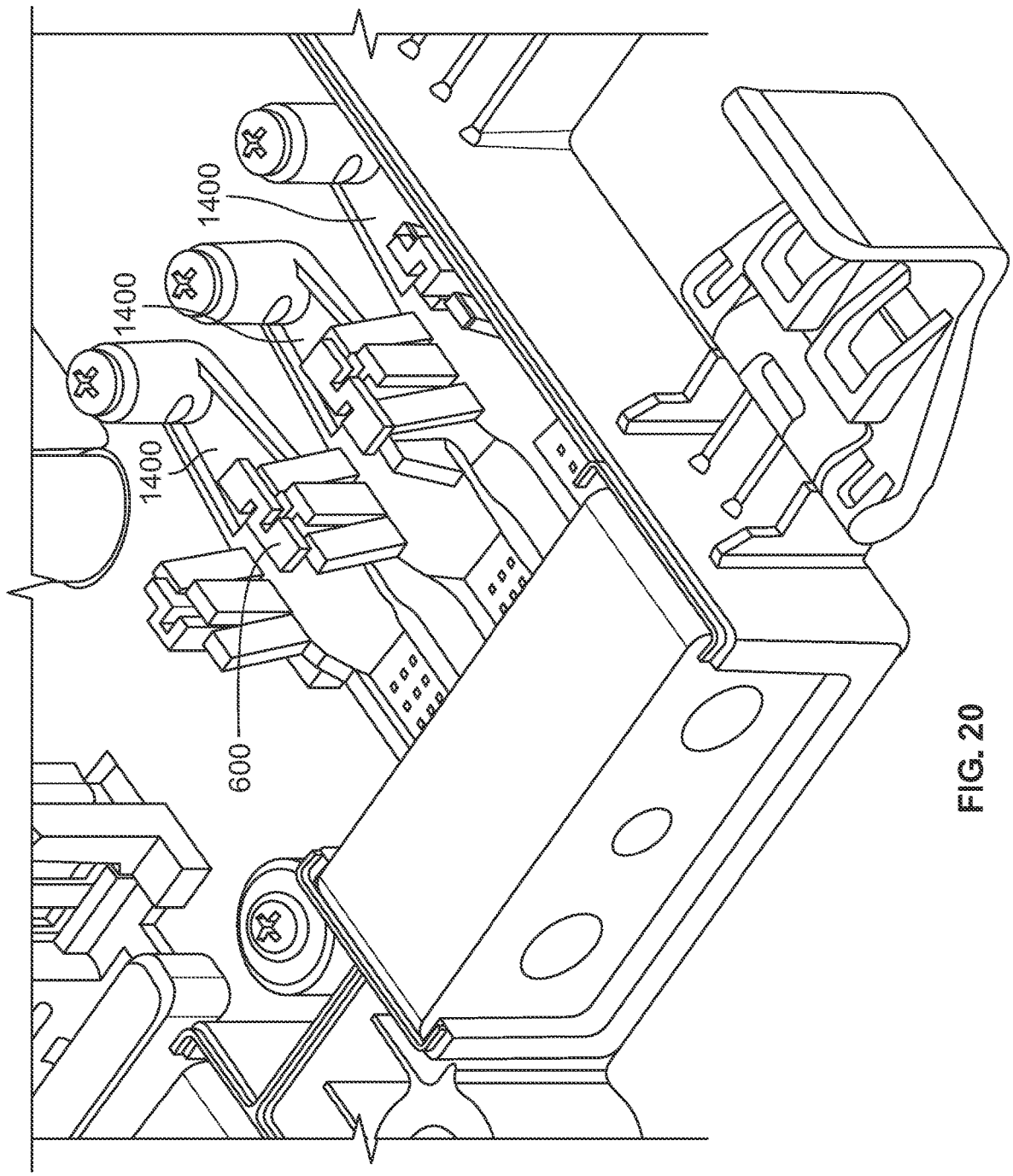
FIG. 20 illustrates an example arrangement of restraint clips.

Referring to FIG. 20, one example arrangement of restraint clips 1400 is shown within a restraint bridge 600; each of the restraint clips 1400 are in the second position. This is but one example of a suitable arrangement of restraint clips 1400 within a restraint bridge 600, and any number of other examples are contemplated. FIG. 20 also illustrates a polygonal cross-section grommet (e.g., rectangular cross-section). This example grommet includes three apertures for three cables 202, 204 (shown in FIG. 2).

Figure 21:
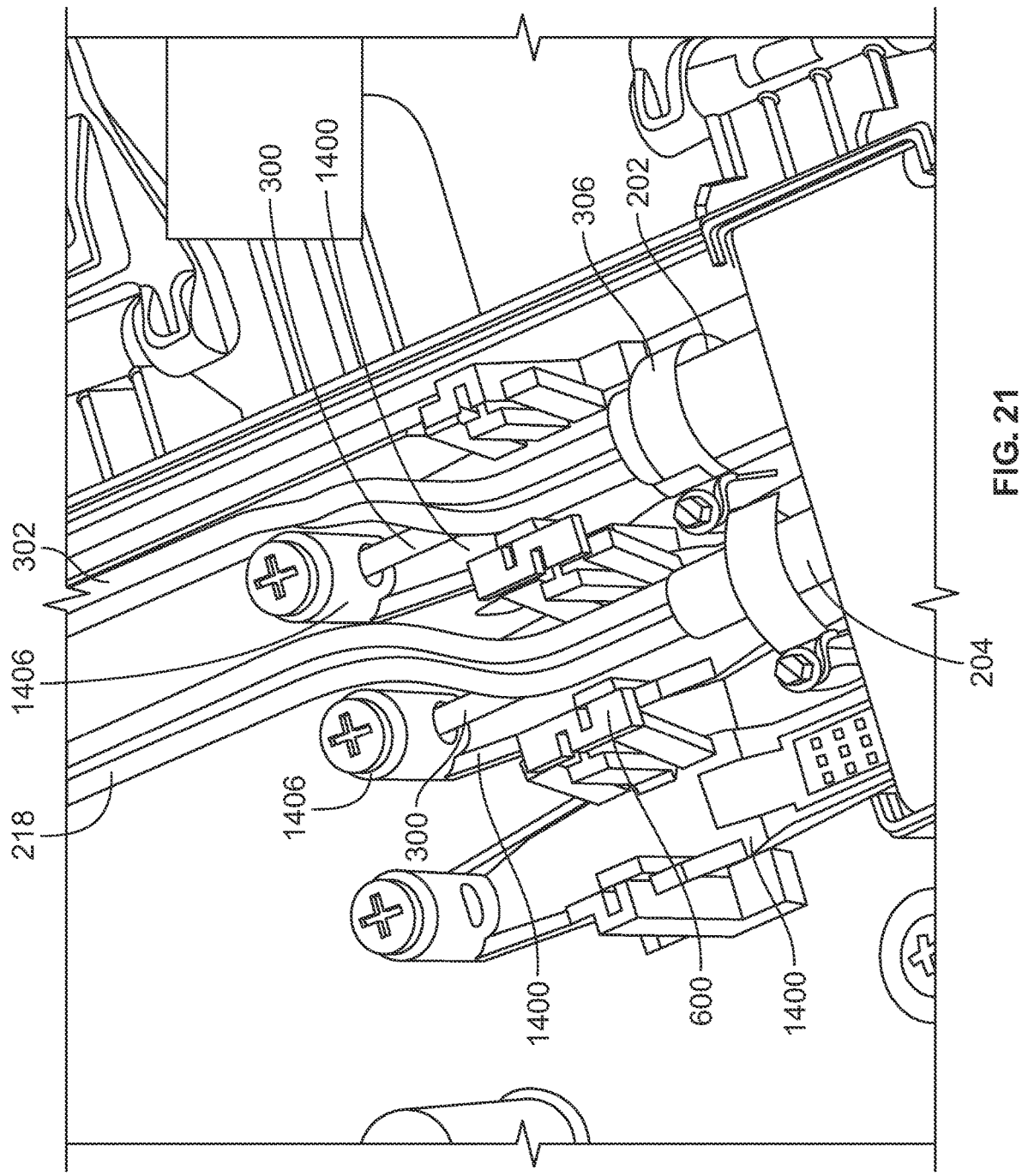
FIG. 21 illustrates one cable mounted to each of two restraint clips.

Referring to FIG. 21, one example cable fixation and routing scheme is illustrated. It is worthy of note that the strength member 300 is fixed in the aperture 1408, and the hose clamp 306 secures the cable 202, 204 to the restraint clip 1400 for a two-location securement between the cable 202, 204 and the restraint clip 1400. As described previously, cables 202, 204 having more than one strength member 300 can be used with alternate restraint clips (e.g., restraint clip 1700) that are configured to secure more than one strength member 300. Fiber optic fibers 218, 302 from the cable 202, 204 are routed past the restraint post 1406 and on to a splice tray(s) 220 or to a slack storage area.

Figures 22, 23:
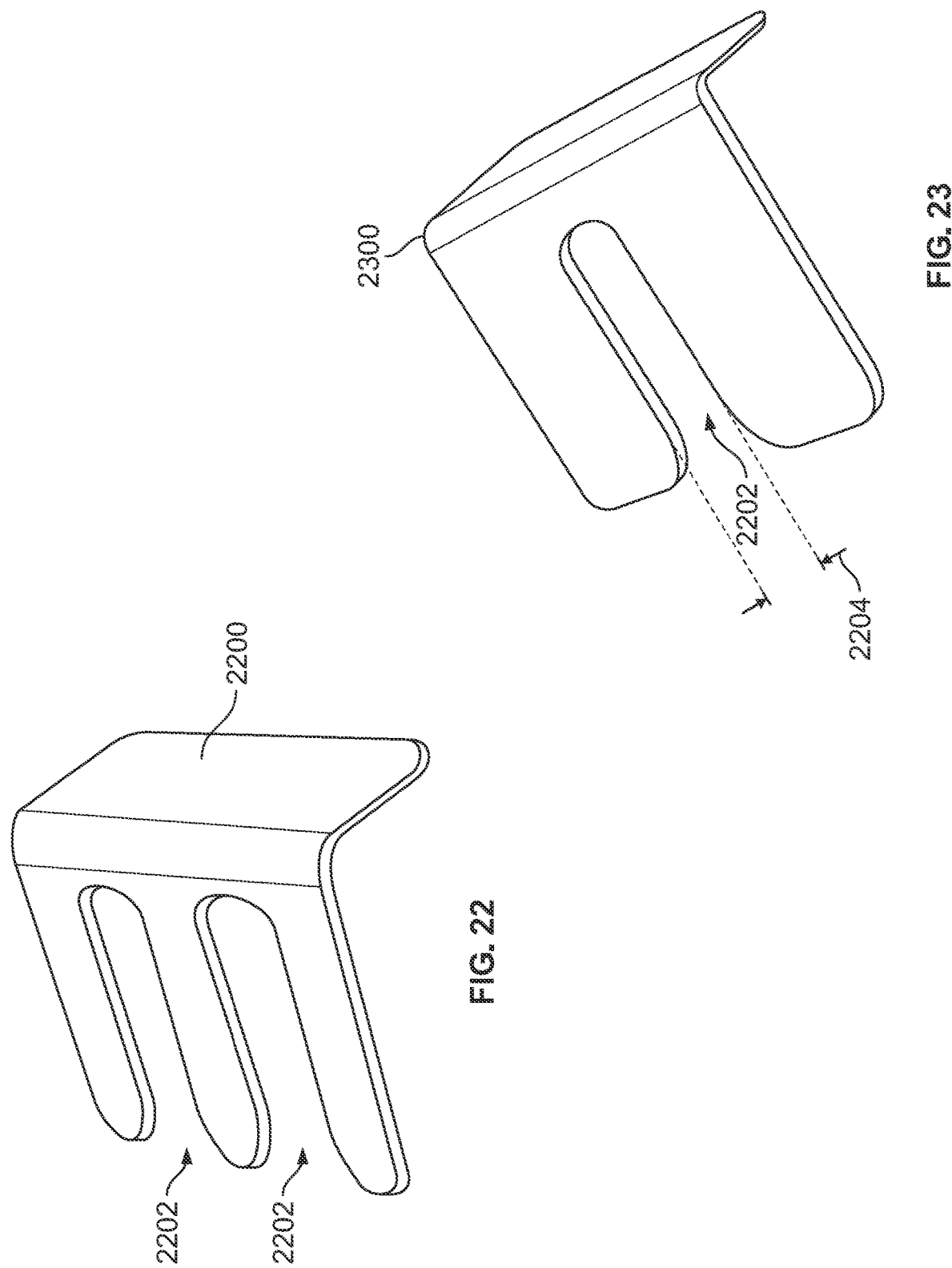
FIG. 22 is a perspective view of an example sheath clip.
FIG. 23 is a perspective view of an example sheath clip.

Referring to FIGS. 22 and 23, two sheath clips 2200, 2300 are illustrated. While many examples of the cables 202, 204 to this point in the disclosure have been described as including the strength member 300 (shown in FIG. 3), some further examples of cables 202, 204 do not include the strength member 300. As such, the restraint post 1406, 1706 cannot function to secure the strength member 300 (and, thus, the cable 202, 204) to the splice enclosure 100. Example splice enclosures 100 for use with cables 202, 204 that do not include the strength member 300 can instead include suitable substitute structures configured to secure the cables 202, 204 to the splice enclosure. For example, the cable restraint 206 can include a sheath clip 2200, 2300 configured to cooperate with the restraint bridge 600. The sheath clip 2200, 2300 is movable from a first position (shown in FIGS. 22 and 23) where the sheath clip 2200, 2300 is detached from the restraint bridge 600 to a second position (shown in FIG. 24) in which the sheath clip 2200, 2300 is attached to the restraint bridge 600. The sheath clip 2200, 2300 defines a slot 2202 having a dimension 2204 that is at least one of equal to or less than a diameter of a sheath 304 of the cable 202, 204.

Figure 24:
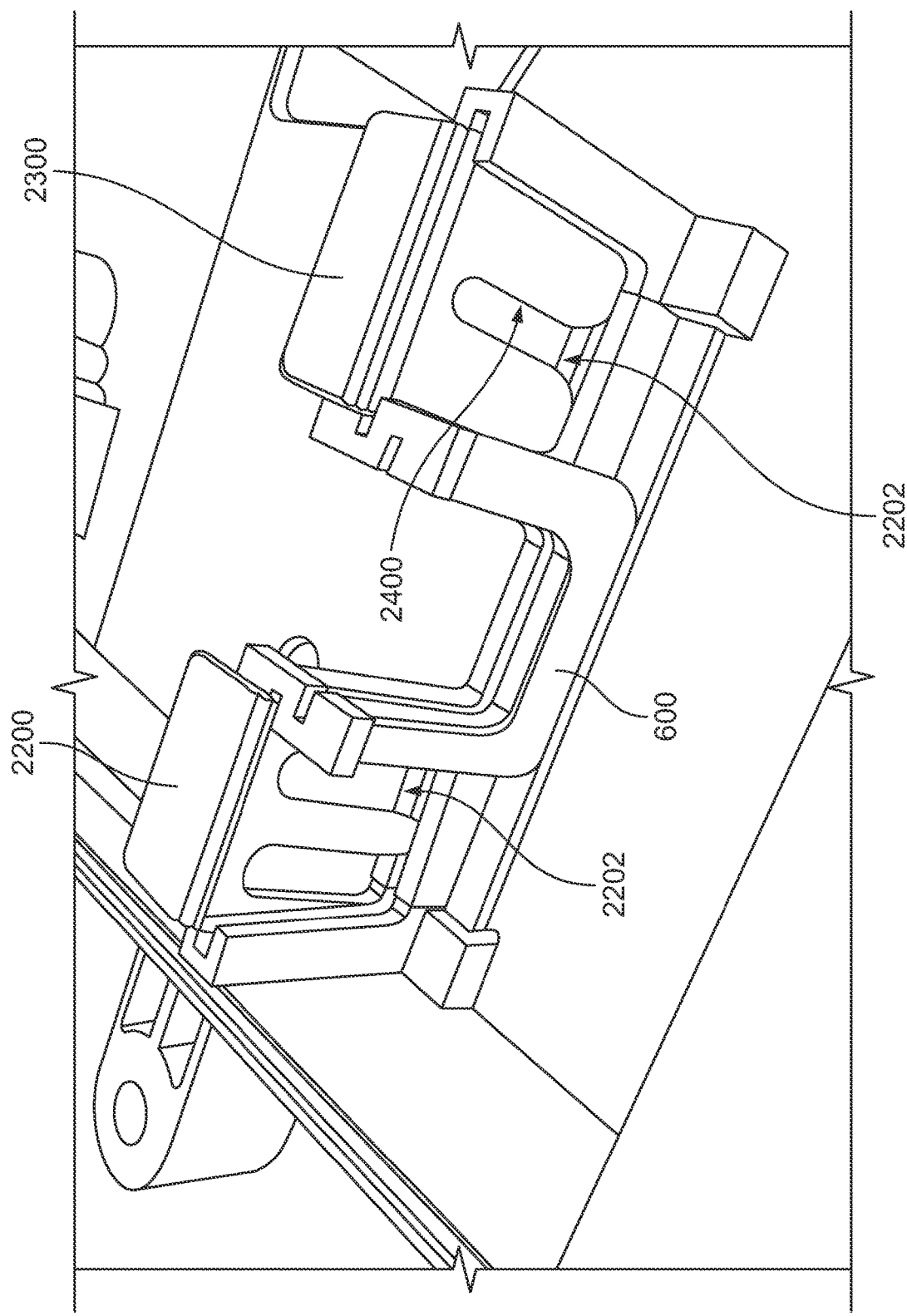
FIG. 24 is a detail view of example sheath clips cooperating with the restraint bridge.

Referring to FIG. 24, an arrangement of sheath clips 2200, 2300 is shown cooperating with the restraint bridge 600 such that the sheath clips 2200, 2300 are in the second position. It is to be appreciated that any suitable combination of sheath clips 2200, 2300, sheath clip arrangements, etc. are satisfactory. As shown, the sheath clips 2200, 2300 can cooperate (e.g., slide into) the first slot 402, the second slot, 608, or both the first slot 402 and the second slot 608 simultaneously. Because the dimension 2204 of the slot 2202 is at least one of equal to or less than a diameter of the sheath 304 of the cable 202, 204, the sheath clip 2200, 2300 imparts a force onto the cable 202, 204 and deforms the sheath 304 when the sheath clip 2200, 2300 is in the second position. The continual application of the force onto the cable 202, 204 is of sufficient magnitude to overcome forces tending to cause relative motion between the cable 202, 204 and the sheath clip 2200, 2300. As such, the sheath clip 2200, 2300 secures the cable 202, 204 to the restraint bridge 600, and, thus, to the splice enclosure 100. Additionally, the insertion of the sheath clips 2200, 2300 into the restraint bridge 600 can help separate, organize, etc. one or more cables 202, 204 used with the splice enclosure 100.

Figure 25A:
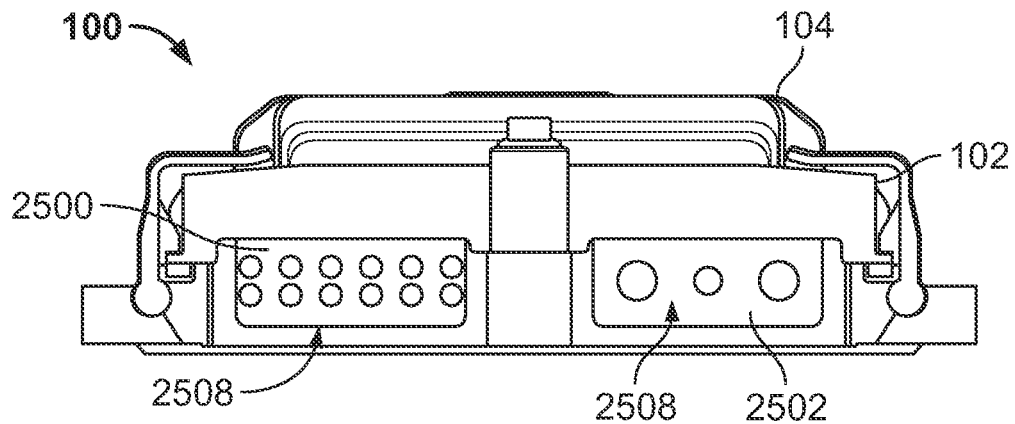
FIG. 25A is an end view of an example splice enclosure illustrating one grommet combination.
Figure 25B:
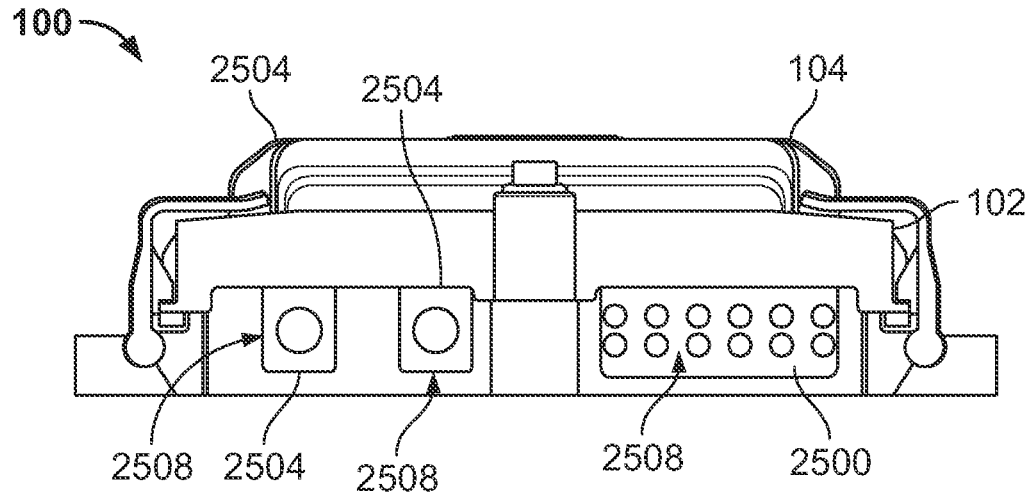
FIG. 25B is an end view of an example splice enclosure illustrating one grommet combination.
Figure 25C:
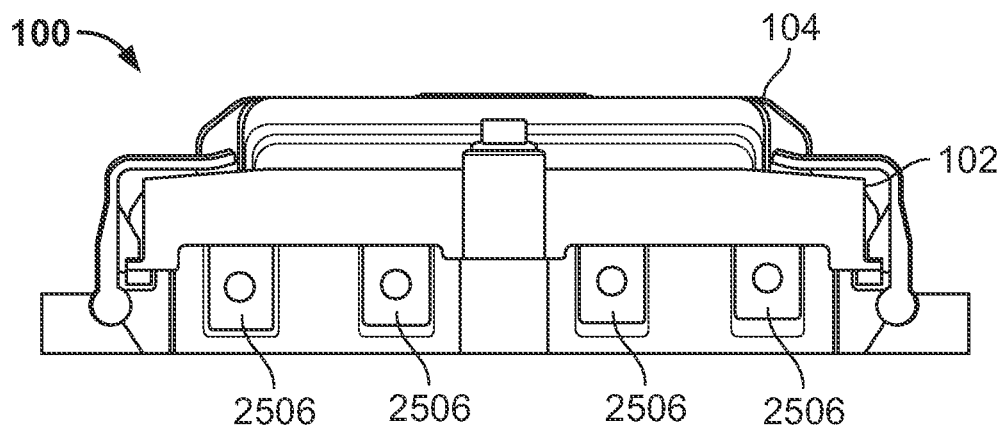
FIG. 25C is an end view of an example splice enclosure illustrating one grommet combination.

Referring to FIGS. 25A to 25C, three possible arrangements of grommets 2500, 2502, 2504, 2506 are illustrated. Referring to FIG. 25A, the cap 104 is provided to the housing 102 to seal the interior space 200 (shown in FIG. 2), wherein at least one of the cap 104 or the housing 102 defines a first aperture 2508 through which the cable 202, 204 extends between an ambient environment and the interior space 200. Any suitable arrangement and design of grommets 2500, 2502, 2504, 2506 can be used with the present disclosure to effectively seal the cable 202, 204 within the aperture 2508. The shown arrangement includes two relatively large, polygonal cross-section grommets 2500, 2502. As illustrated, the grommet 2500 can define any suitable number of apertures enabling cables (e.g., drop cables) to pass from the ambient environment to the interior space 200. Any grommet apertures not in use can be provided with a plug to help prevent contaminants from gaining entry to the interior space 200. The grommet 2502 can define multiple (e.g., three) apertures, two for express cable passage to the interior space 200, and one for a branch cable.

Referring to FIG. 25B, as with the previous example, the cap 104 is provided to the housing 102 to seal the interior space 200 (shown in FIG. 2). The shown arrangement includes one relatively large, polygonal cross-section grommet 2500 within the first aperture to the right. The left side of the splice enclosure 100 shows two first apertures 2508 including two square cross-section grommets 2504. The two square cross-section grommets 2504 can define a number of different aperture diameters to suit particular cables 202, 204 or particular applications.

Referring to FIG. 25C, as with the previous examples, the cap 104 is provided to the housing 102 to seal the interior space 200 (shown in FIG. 2). The shown arrangement includes four square cross-section grommets 2500 each occupying a dedicated first aperture 2508. The left side of the splice enclosure 100 shows two first apertures 2508 including two square cross-section grommets 2504. The four square cross-section grommets 2506 can define a number of different aperture diameters to suit particular cables 202, 204. In fact, the grommet 2504 defines an aperture configured to surround the exterior surface of the cable 202, 204 to seal the interior space 200 defined within the housing 102 and the cap 104.

Figure 26:
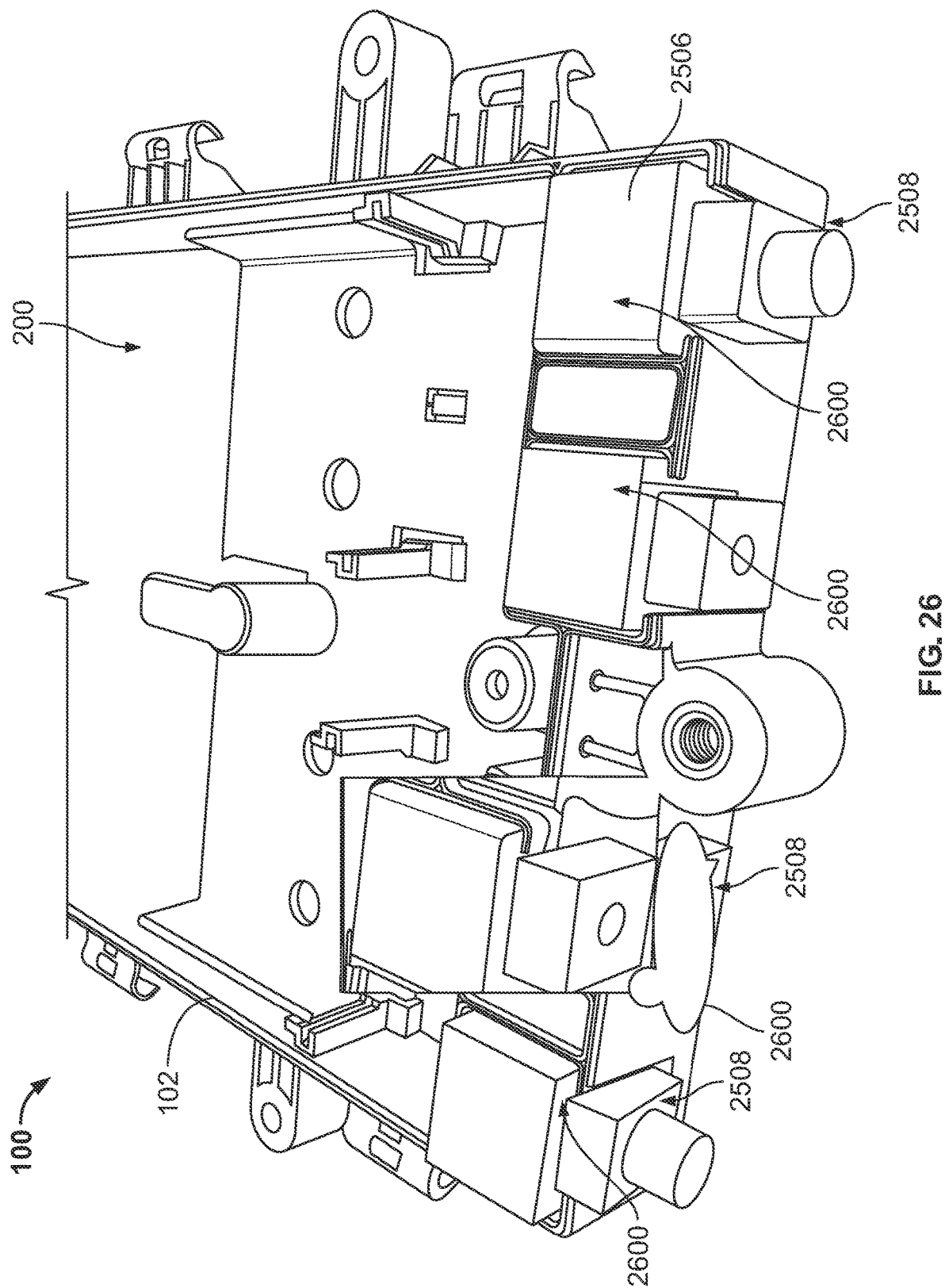
FIG. 26 is a detail view of the splice enclosure having four square cross-section grommets.

Referring to FIG. 26, at least one of the housing 102 or the cap 104 (shown in FIG. 25) define a second aperture 2600 adjacent to the first aperture 2508. The grommet 2500, 2502, 2504, 2506 that seals a space between a sidewall 2602 of at least one of the housing 102 or the cap 104 that defines the first aperture 2508 and an exterior surface of the cable 202, 204 extending into the interior space 200, the grommet is selectively moved from a first position (as shown to the right of FIG. 26) where the grommet is positioned at least partially within the second aperture 2600 to a second position (as shown with the second grommet 2506 from the left of FIG. 26) where the grommet 2506 is not positioned within the second aperture 2600. As shown, the grommet 2500, 2502, 2504, 2506 can be moved from the first position to the second position by moving the grommet 2500, 2502, 2504, 2506 in a direction that is generally perpendicular or in a direction non-parallel to the tray 208. The grommet 2506 can then be replaced, cleaned, put back into service, etc. by reversing the order of steps previously described to remove the grommet 2506. Additionally, enablement of the grommet 2500, 2502, 2504, 2506 to be moved from the first position to the second position can be advantageous because a line worker can then remove the cable 202, 204 from the splice enclosure 100 to work on the cable 202, 204 or other associated components in a space exterior to the splice enclosure 100 while the cable 202, 204 remains attached to the restraint clip 1400 or the cable 202, 204 remains attached to the restraint bridge 600.

Figure 27:
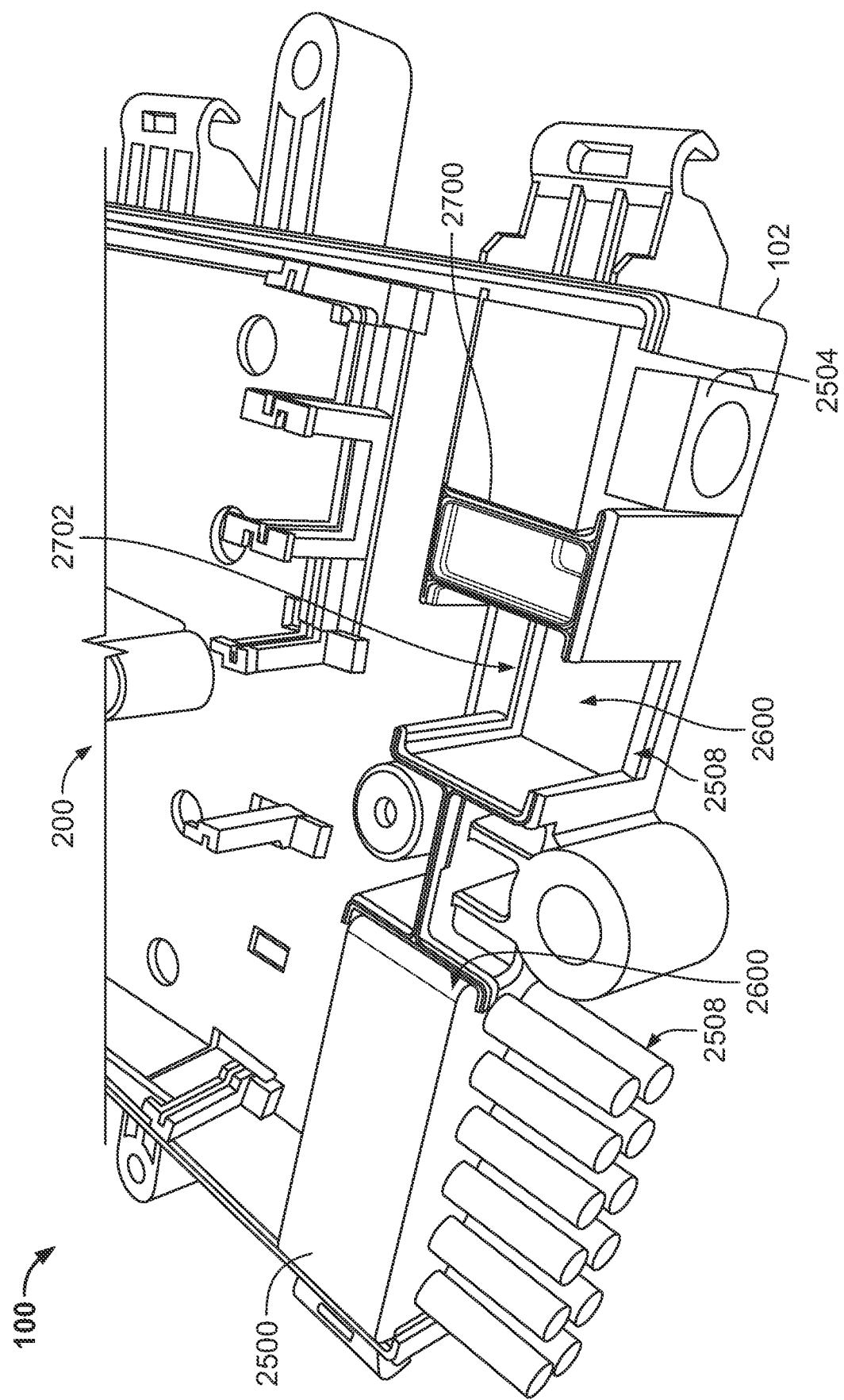
FIG. 27 is a detail view of the splice enclosure having positions for two square cross-section grommets and one position for a rectangular grommet.

Referring to FIG. 27, the modularity of the second aperture 2600 is illustrated. As shown, a polygonal cross-section (e.g., rectangular cross-section) grommet 2500 is shown in use with a square cross-section grommet 2504. In some examples, it is possible to utilize multiple types and sizes of grommets 2500, 2502, 2504, 2506 within the second aperture 2600. In the example splice enclosures 100 exhibiting this feature, the second aperture 2600 is defined such that the grommet 2500, 2502, 2504, 2506 can be selected from a number of grommets 2500, 2502, 2504, 2506 to configure an assembly of the housing 102 and the cap 104 for at least one of a particular cable or a particular set of cables 202, 204. In other words, designers and operators can select various grommets 2500, 2502, 2504, 2506 to tailor the particular splice enclosure 100 assembly to a particular application or set of cables 202, 204.

In some examples, a second aperture 2600 having a standard size or standard dimensions will accommodate many or all of the potential grommet selections. For example, the second aperture 2600 shown on the left side is configured such that a rectangular grommet 2500 (e.g., a grommet of polygonal cross-section) defining multiple apertures for multiple cables is positioned at least partially within the second aperture 2600. It is also to be appreciated that further modularity can be promoted by designing and manufacturing a selectively removable interior wall 2700 that can be inserted, removed, shifted, etc. to enable use of greater numbers of grommets 2500, 2502, 2504, 2506 having various sizes, shapes, etc.

In some examples, at least one of the housing 102 or the cap 104 define a third aperture 2702 configured such that a polygonal cross-section grommet (e.g., grommet 2500) is positioned at least partially within the third aperture 2702 that is behind the grommet 2500 at the left of FIG. 27.

FIG. 27 illustrates the grommet 2500 in the first position within a second aperture 2600 (to the far left) and the grommet 2504 located in another second aperture 2600 on the far right of the splice enclosure 100. Also shown is a second aperture 2600 (nearest to reference character 2702) located between the two grommets 2500, 2504 wherein the grommet 2504 has been moved to the second position (e.g., removed from the second aperture 2600) for clarity. At this location, at least one of the housing 102 or the cap 104 defines the first aperture 2508 that enables passage of the cable 202, 204 through the outside portion of the side wall or housing 102. The first aperture 2508 leads to the second aperture 2600 which can be configured to at least partially contain the grommet 2500, 2502, 2504, 2506. The third aperture 2702 then enables passage of the cable 202, 204 from the second aperture 2600 into the interior space 200. It is also to be appreciated that, as shown, the grommet 2504 includes a portion within the second aperture 2600, and a portion that extends through the first aperture 2508 into the ambient atmosphere (e.g., space exterior to the splice enclosure). This can be true for any of the grommets 2500, 2502, 2504, 2506 relative to the first aperture 2508 and the third aperture 2702.

Referring to FIG. 28, a series of restraint clips 1400 are shown cooperating with first posts 400 extending from the tray 208. This is but one illustration of the modularity of the system describe herein. That is to say that a great number of different restraint clips 1400 and restraint bridges 600 can be used to restrain various cables 202, 204, all of these modular items can be used with one common tray 208. In some examples, the tray 208 is universal to all of the described components of the present disclosure.

The apparatus and methods of the present disclosure can include several benefits. In some examples, the modular restraint bridge and restraint clips can be termed a rail system. The rail system accepts different inserts to configure the base as needed in the field with one storage tray design. This modular design gives operators greater flexibility in the field. Each of the restraint bridge and the restraint clip can include a snap feature to provide tactile and aural cues to proper location of components. Additionally, the operator can remove (in the field) the restraint bridge, the restraint clip, or both while the restraint clip remains attached to the cable. This means the operator can work on the fiber optic fibers and attachment schemes outside of the splice enclosure, but while the fiber optic cable remains attached to the restraint clip. Furthermore, the modular aperture design for the grommets enables greater flexibility for the number and types of cables used with each splice enclosure and can limit model numbers of splice enclosures used for various purposes. Still further, the described structures and methods can enable myriad configurations of the rail system, grommets, restraint clips, etc. while using only one (universal) storage tray design regardless of the many different cables and/or grommets that may be used in conjunction with the splice enclosure.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cable restraint for location within a splice enclosure to restrain a cable extending into the splice enclosure, the cable restraint comprising:
    a tray extending from an open end to a cable storage end, the tray comprising:
        a bottom side having an upward facing surface; and
        a tab feature, wherein:
            the open end enables a cable to pass onto the upward facing surface, and
            the cable storage end provides storage space;
    a restraint bridge removably attached to the tray, the restraint bridge comprising:
        a central portion having a surface configured to cooperate with the tab feature to inhibit relative motion between the restraint bridge and the tray in a direction non-perpendicular to an axis of the cable; and
    a restraint clip removably attached to the restraint bridge and coupled to the cable, the restraint clip comprising:
        a body portion;
        a surface defined by the body portion configured to support the cable as the cable passes over the body portion;
        a restraint post attached to the body portion configured to secure a strength member of the cable to the restraint clip; and
        a column attached to and extending away from the body portion configured to inhibit relative motion between the restraint clip and the restraint bridge in the direction non-perpendicular to the axis of the cable; wherein:
    the tray comprises a first post attached to and extending away from the upward facing surface,
    the restraint bridge comprises: a second post attached to and extending away from the central portion, the second post configured to apportion a space above the central portion for the cable to pass through, the second post defining a second slot,
    the second post of the restraint bridge comprises a tab extending away from the second post, the tab defining a tab surface, and
    the restraint clip comprises a flexible finger attached to and extending away from the body portion of the restraint clip, the flexible finger defines a finger surface configured to cooperate with the tab surface.

2. The cable restraint of claim 1, wherein the column comprises:
    a rib feature cooperating with the second slot to inhibit relative motion between the restraint clip and the restraint bridge in the direction non-perpendicular to the axis of the cable.

3. The cable restraint of claim 1, wherein:
    the restraint clip is movable from a first position where the restraint clip is not attached to the restraint bridge to a second position where the restraint clip is attached to the restraint bridge,
    the flexible finger is elastically deformable, and
    movement of the restraint clip from the first position to the second position causes the flexible finger to elastically deform until the finger surface passes by the tab surface enabling the flexible finger to revert to an undeformed position such that the finger surface cooperates with the tab surface to inhibit relative motion between the restraint clip and the restraint bridge in a direction perpendicular to the upward facing surface.

4. The cable restraint of claim 3, wherein the flexible finger can be elastically deformed to move the finger surface away from the tab surface such that the restraint clip can be at least one of detached from or attached to the restraint bridge while the cable is secured to the restraint clip.

5. The cable restraint of claim 4, wherein the surface defined by the body portion of the restraint clip comprises a pointed feature configured to impinge on a sheath of the cable and a portion of the body portion includes a curved surface configured to cooperate with a clamp such that the clamp secures the cable to the restraint clip.

6. The cable restraint of claim 1, wherein the restraint post defines an aperture such that an end of a strength member of the cable can be removably inserted into the aperture to secure the cable to the restraint clip.

7. The cable restraint of claim 6, wherein the restraint post comprises a set screw movable from a first position to a second position, wherein when in the first position, the set screw does not secure the strength member to the restraint post and when in the second position, the set screw secures the strength member to the restraint post.

8. The cable restraint of claim 6, wherein the restraint clip comprises a hose clamp removably attached to the restraint clip such that the hose clamp secures the cable to the restraint clip, wherein the combination of the restraint post and the hose clamp provide two locations of securement of the cable to the restraint clip.

9. The cable restraint of claim 1, wherein an open space is located between a portion of the first post and the upward facing surface.

10. A cable restraint for location within a splice enclosure to restrain a cable extending into the splice enclosure, the cable restraint comprising:
   a tray extending from an open end to a cable storage end, the tray comprising:
      a bottom side having an upward facing surface;
      a first post attached to and extending away from the upward facing surface, the first post defining a first slot; and
      a tab feature, wherein:
         the open end enables a cable to pass onto the upward facing surface, and
         the cable storage end provides storage space; and
   a restraint bridge removably attached to the tray and coupled to the cable, the restraint bridge comprising:
      a central portion having a surface configured to cooperate with the tab feature to inhibit relative motion between the restraint bridge and the tray in a direction non-perpendicular to an axis of the cable; and
      a second post, the second post attached to and extending away from the central portion, the second post configured to apportion a space above the central portion for the cable to pass through, wherein:
   the first slot is non-parallel to the upward facing surface to cooperate with a mechanism to which the cable is coupled to inhibit relative motion between the cable and the splice enclosure.

11. The cable restraint of claim 10, comprising a sheath clip configured to cooperate with the restraint bridge, the sheath clip movable from a first position where the sheath clip is detached from the restraint bridge to a second position where the sheath clip is attached to the restraint bridge, the sheath clip configured to secure the cable to the restraint bridge.

12. The cable restraint of claim 11, wherein the sheath clip defines a slot having a dimension that is at least one of equal to or less than a diameter of a sheath of the cable such that the sheath clip deforms the sheath of the cable when the sheath clip is in the second position.

13. The cable restraint of claim 10, wherein the restraint bridge comprises a bar configured to provide a separation distance between the cable and the upward facing surface.

14. The cable restraint of claim 10, wherein an open space is located between a portion of the first post and the upward facing surface.

15. The cable restraint of claim 10, comprising a restraint clip.

16. The cable restraint of claim 15, wherein the restraint clip comprises a flexible finger.

17. A cable restraint for location within a splice enclosure to restrain a cable extending into the splice enclosure, the cable restraint comprising:
   a tray extending from an open end to a cable storage end, the tray comprising:
      a bottom side having an upward facing surface; and
      a tab feature, wherein:
         the open end enables a cable to pass onto the upward facing surface,
         the cable storage end provides storage space;
   a restraint bridge removably attached to the tray and coupled to the cable, the restraint bridge comprising:
      a central portion having a surface configured to cooperate with the tab feature to inhibit relative motion between the restraint bridge and the tray in a direction non-perpendicular to an axis of the cable; and
   an attachment structure attached to the tray, a portion of the attachment structure spaced a distance away from the upward facing surface of the bottom side to define an open space, wherein:
   the open space enables a portion of the restraint bridge to be located between the portion of the attachment structure spaced a distance away from the upward facing surface and the upward facing surface to inhibit relative motion between the restraint bridge and the tray in a direction non-parallel to the upward facing surface,
   the attachment structure comprises a first post attached to and extending away from the upward facing surface,
   the open space is an undercut located between the first post and the upward facing surface, and
   the first post defines a first slot that is non-parallel to the upward facing surface to cooperate with a mechanism to which the cable is coupled to inhibit relative motion between the cable and the splice enclosure.

18. The cable restraint of claim 17, wherein:
the attachment structure comprises a tab attached to and extending away from the upward facing surface, and
the open space is an undercut located between the tab and the upward facing surface.

19. The cable restraint of claim 17, wherein the restraint bridge comprises a post extending away from a central portion of the restraint bridge, the post configured to apportion a space above the central portion for the cable to pass through.

20. The cable restraint of claim 17, comprising a restraint clip that comprises a flexible finger.

* * * * *